(12) United States Patent
Fletcher

(10) Patent No.: US 10,944,302 B2
(45) Date of Patent: Mar. 9, 2021

(54) PERMANENT-MAGNET GENERATOR INCORPORATING A VARIABLE-RELUCTANCE STATOR SYSTEM

(71) Applicant: WILLIAMS INTERNATIONAL CO., L.L.C., Pontiac, MI (US)

(72) Inventor: Tristan M. Fletcher, Wixom, MI (US)

(73) Assignee: WILLIAMS INTERNATIONAL CO., L.L.C., Pontiac, MI (US)

( * ) Notice: Subject to any disclaimer, the term of this patent is extended or adjusted under 35 U.S.C. 154(b) by 15 days.

(21) Appl. No.: 16/379,715

(22) Filed: Apr. 9, 2019

(65) Prior Publication Data
US 2019/0312474 A1   Oct. 10, 2019

Related U.S. Application Data

(60) Provisional application No. 62/655,176, filed on Apr. 9, 2018.

(51) Int. Cl.
*H02K 1/27* (2006.01)
*H02K 1/16* (2006.01)
(Continued)

(52) U.S. Cl.
CPC ............ *H02K 1/2746* (2013.01); *H02K 1/16* (2013.01); *H02K 1/27* (2013.01); *H02K 1/278* (2013.01);
(Continued)

(58) Field of Classification Search
CPC .......... H02K 1/16; H02K 1/185; H02K 1/187; H02K 1/27; H02K 1/2713; H02K 1/2746; H02K 1/278; H02K 3/42; H02K 3/493
(Continued)

(56) References Cited

U.S. PATENT DOCUMENTS

| 1,140,155 A | 5/1915 | Heins |
| 2,610,993 A | 9/1952 | Stark |

(Continued)

FOREIGN PATENT DOCUMENTS

| CN | 101789735 B | 4/2012 |
| CN | 204103802 U | 1/2015 |

(Continued)

*Primary Examiner* — Tulsidas C Patel
*Assistant Examiner* — Rashad H Johnson
(74) *Attorney, Agent, or Firm* — Raggio & Dinnin, P.C.; Kurt L. VanVoorhies

(57) ABSTRACT

A variable-reluctance stator system for use with a radial-flux rotor of a permanent-magnet generator incorporates radially-oriented stator teeth uniformly circumferentially distributed around a central axis, and at least one moveable magnetically-permeable element in magnetic communication with at least one pair of adjacent stator teeth. Radially-inboard edges of the stator teeth are located outside a cylindrical boundary centered about the central axis and configured to receive the radial-flux rotor. Each moveable magnetically-permeable element is axially positionable relative to the stator teeth along an associated positioning axis substantially parallel to the central axis, so as to provide for linking magnetic flux between the pair of adjacent stator teeth via the moveable magnetically-permeable element. A series magnetic reluctance of the pair of adjacent stator teeth in series with the moveable magnetically-permeable element is responsive to an axial position of the moveable magnetically-permeable element relative to the pair of adjacent stator teeth.

25 Claims, 15 Drawing Sheets

(51) Int. Cl.
 *H02K 1/18* (2006.01)
 *H02K 3/42* (2006.01)
(52) U.S. Cl.
 CPC ........... *H02K 1/2713* (2013.01); *H02K 1/185* (2013.01); *H02K 1/187* (2013.01); *H02K 3/42* (2013.01)
(58) Field of Classification Search
 USPC ............ 310/49.04, 49.33, 49.34, 49.46, 105, 310/154.08, 154.09, 154.26, 154.27, 310/216.01, 216.075, 216.076, 216.087, 310/216.099, 216.106, 216.113, 223, 310/254.1
 See application file for complete search history.

(56) References Cited

U.S. PATENT DOCUMENTS

| | | | |
|---|---|---|---|
| 3,411,027 A | 11/1968 | Rosenberg | |
| 4,587,449 A | 5/1986 | West | |
| 4,672,291 A | 6/1987 | Rosenberg | |
| 5,455,473 A | 10/1995 | Lipo et al. | |
| 5,672,925 A | 9/1997 | Lipo et al. | |
| 5,825,112 A | 10/1998 | Lipo et al. | |
| 6,208,053 B1 | 3/2001 | Scott | |
| 7,550,894 B2 | 6/2009 | Hino et al. | |
| 7,777,384 B2 | 8/2010 | Gieras et al. | |
| 7,859,231 B2 | 12/2010 | Gieras et al. | |
| 7,906,884 B2 | 3/2011 | Hino et al. | |
| 8,072,108 B2 | 12/2011 | Finkle et al. | |
| 8,093,776 B2 | 1/2012 | Hino et al. | |
| 8,097,993 B2 | 1/2012 | Finkle et al. | |
| 8,373,325 B2 * | 2/2013 | Ichiyama | H02K 1/2746 310/181 |
| 8,395,468 B2 | 3/2013 | Stephenson et al. | |
| 8,952,587 B2 | 2/2015 | Finkle | |
| 9,219,395 B2 * | 12/2015 | Powell | H02K 7/1823 |
| 10,081,238 B2 | 9/2018 | Hino | |
| 2006/0175923 A1 * | 8/2006 | Abou Akar | H02K 16/02 310/114 |
| 2013/0187504 A1 | 7/2013 | Tanaka | |
| 2014/0111051 A1 * | 4/2014 | Tomizawa | H02K 1/278 310/156.12 |
| 2014/0285057 A1 * | 9/2014 | Aoyama | H02K 3/28 310/210 |
| 2017/0240053 A1 | 8/2017 | Hino | |
| 2017/0244348 A1 | 8/2017 | Hino | |
| 2017/0244349 A1 | 8/2017 | Hino | |
| 2017/0253233 A1 | 9/2017 | Masuda et al. | |
| 2017/0256106 A1 | 9/2017 | Hino | |
| 2018/0309394 A1 | 10/2018 | Holmes et al. | |

FOREIGN PATENT DOCUMENTS

| | | |
|---|---|---|
| CN | 104852630 A | 8/2015 |
| EP | 2187508 A1 | 5/2010 |
| EP | 2200161 A1 | 6/2010 |
| GB | 641614 A | 8/1950 |
| GB | 1133797 A | 11/1968 |
| GB | 2450465 B | 3/2011 |
| GB | 2484161 B | 4/2012 |
| GB | 2484162 B | 4/2012 |
| GB | 2484163 B | 4/2012 |
| GB | 2484164 B | 4/2012 |
| GB | 2485217 B | 3/2013 |
| GB | 2485300 B | 3/2013 |
| GB | 2485301 B | 3/2013 |
| WO | 9419855 A1 | 9/1994 |
| WO | 201153473 A2 | 5/2011 |

* cited by examiner

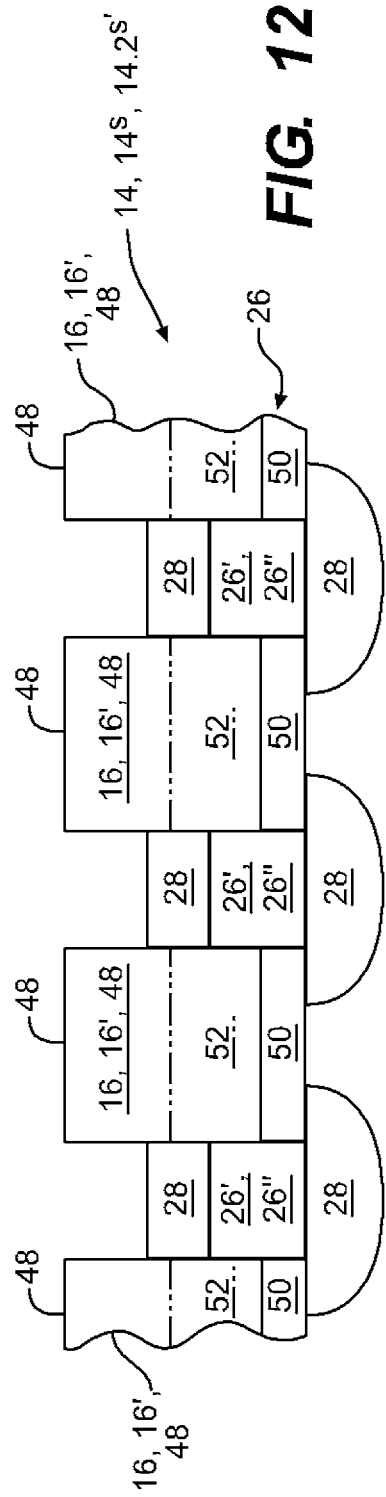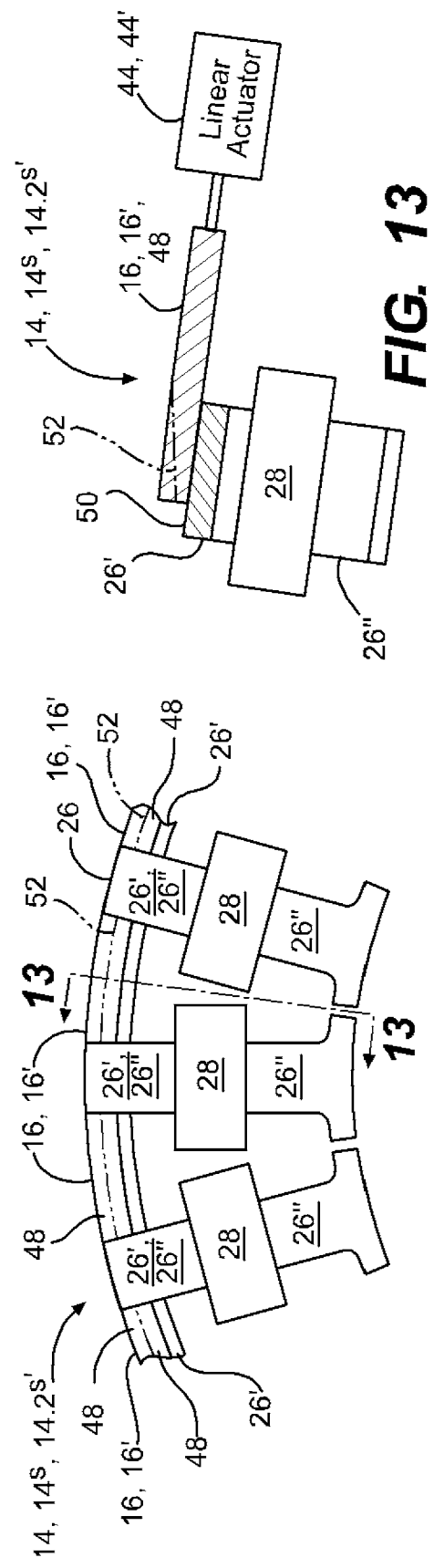

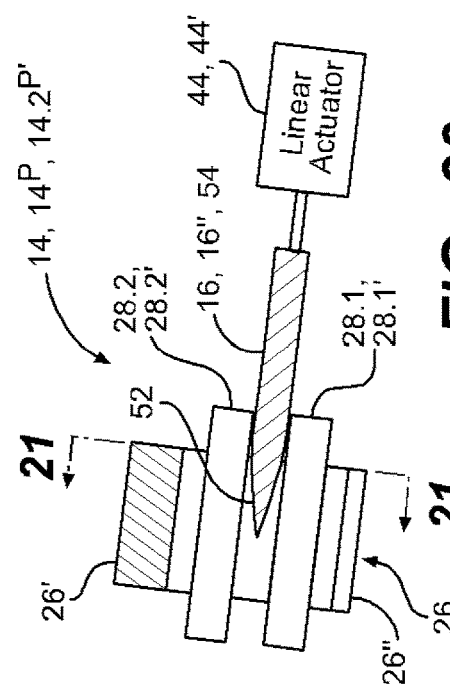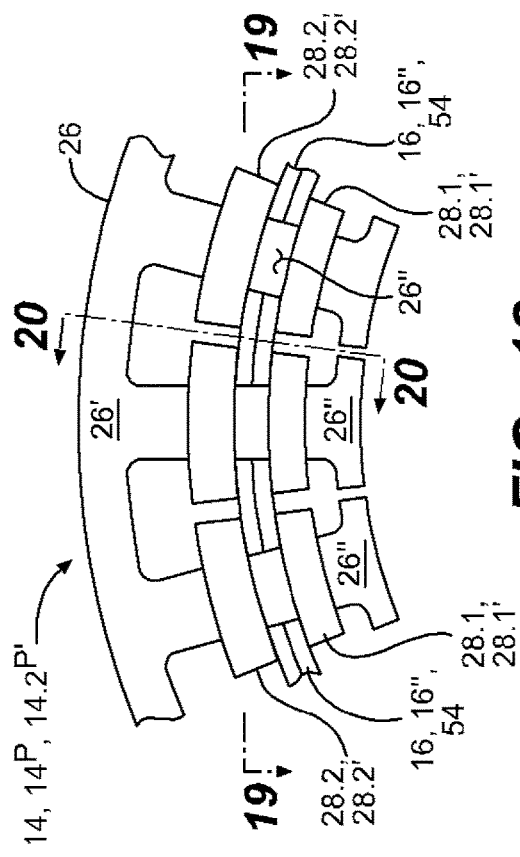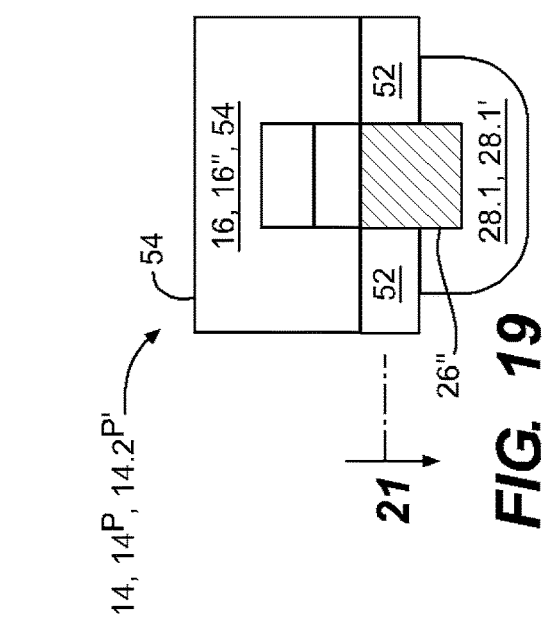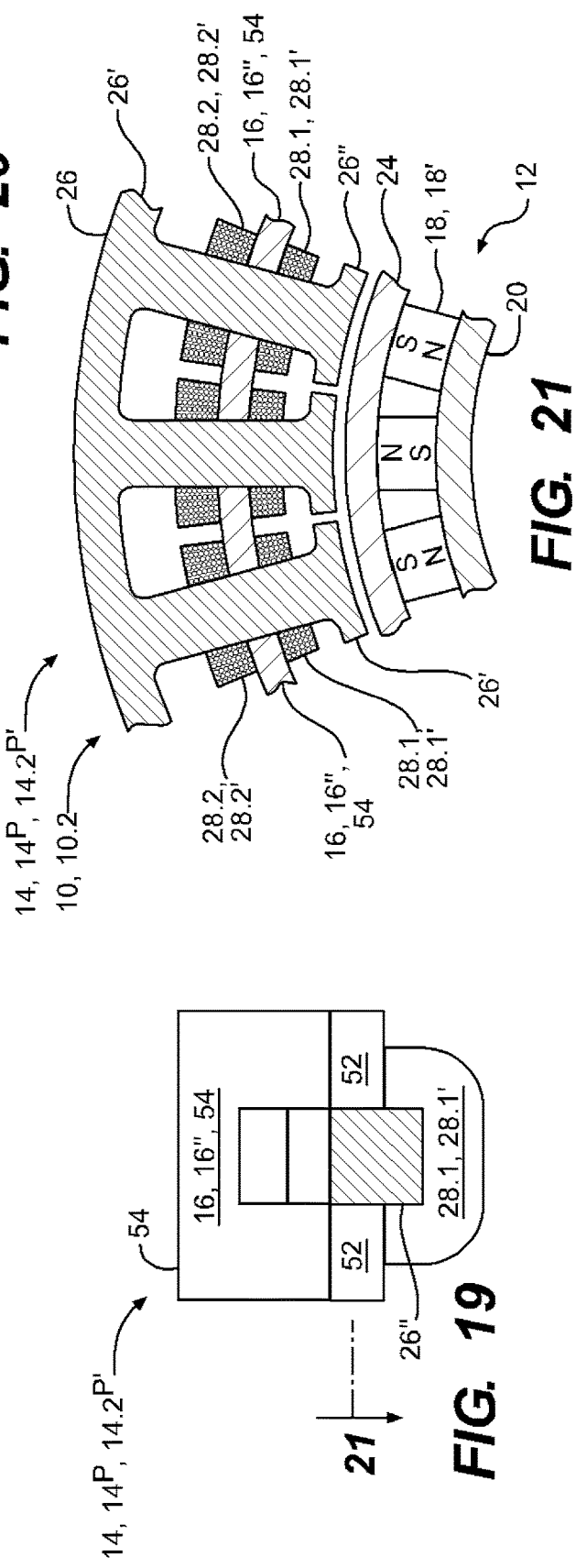

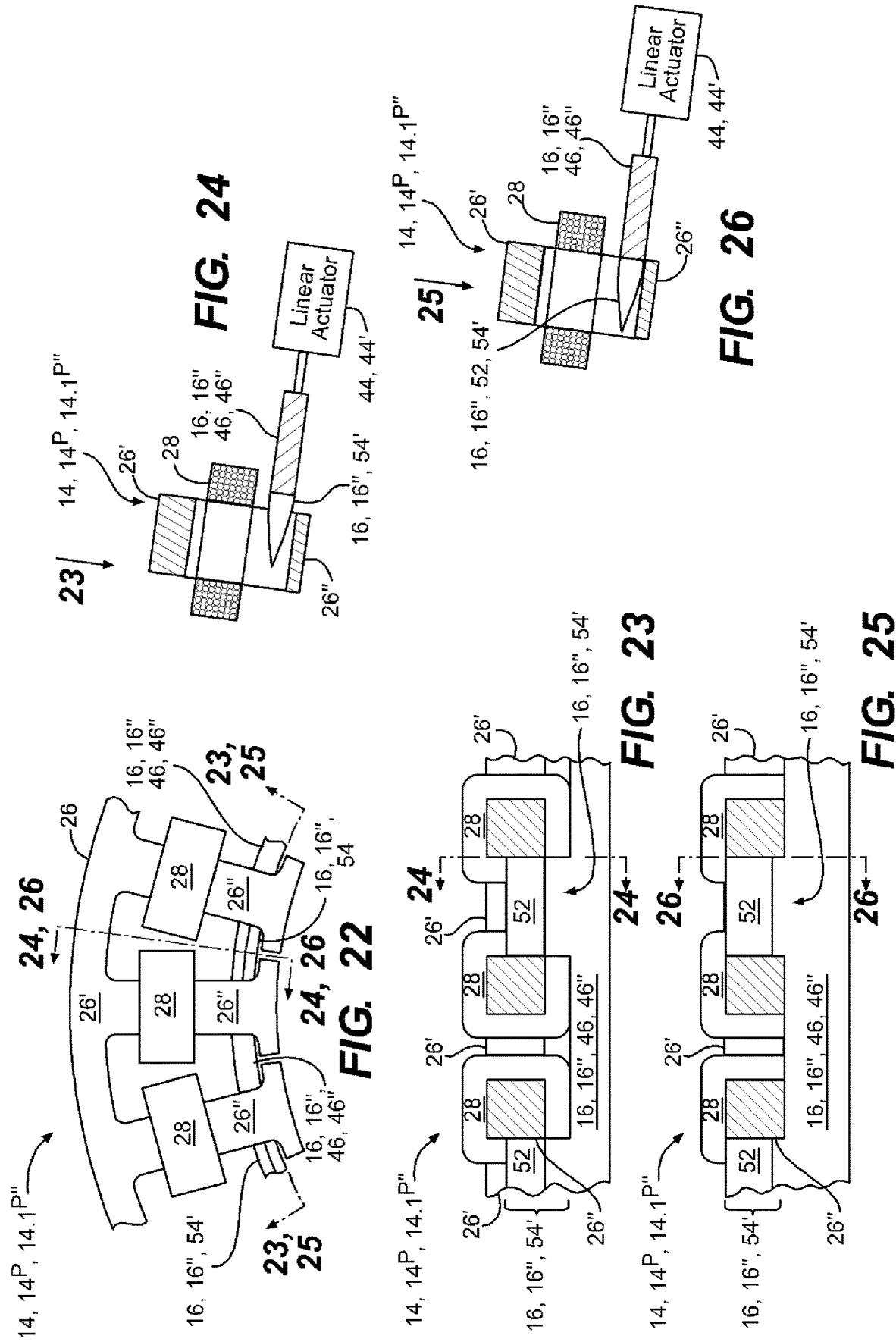

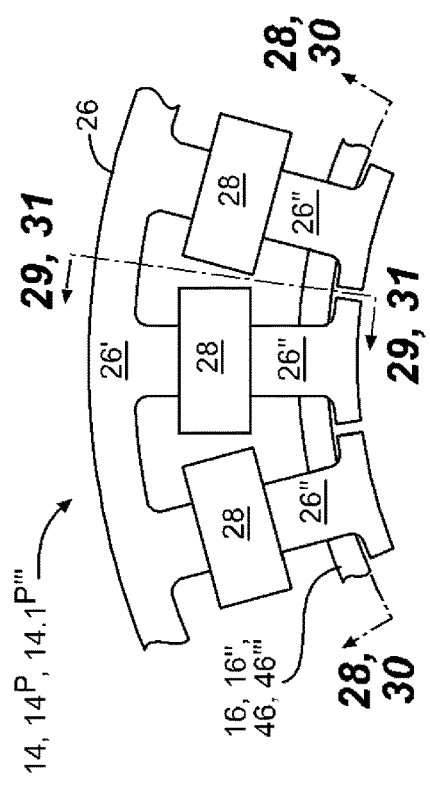
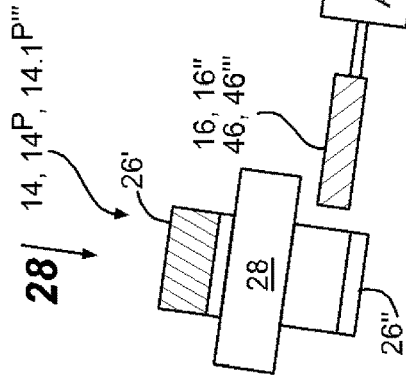
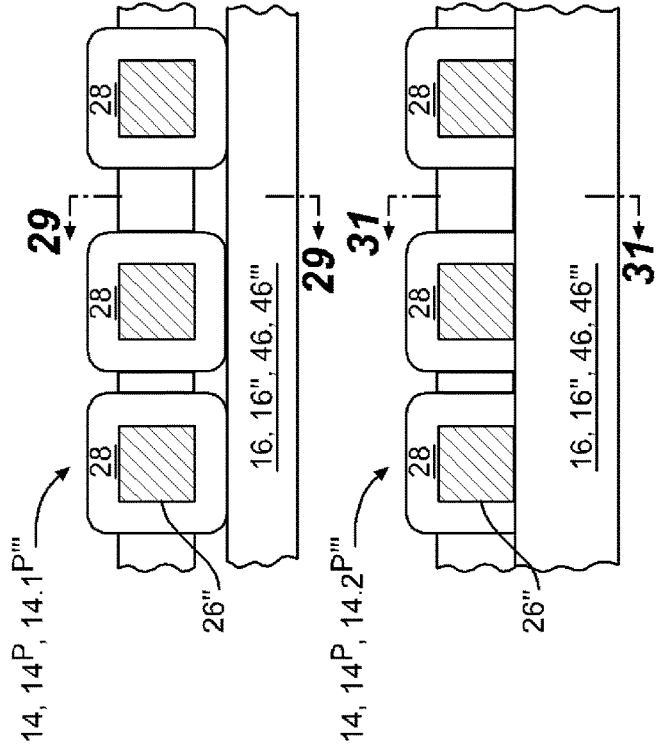
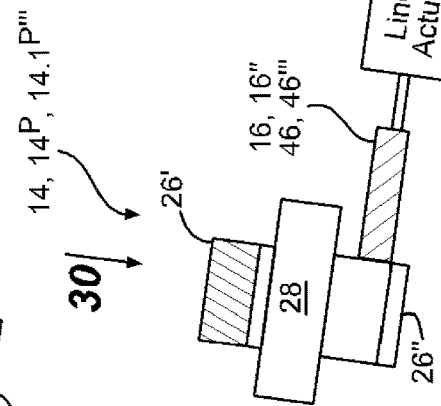

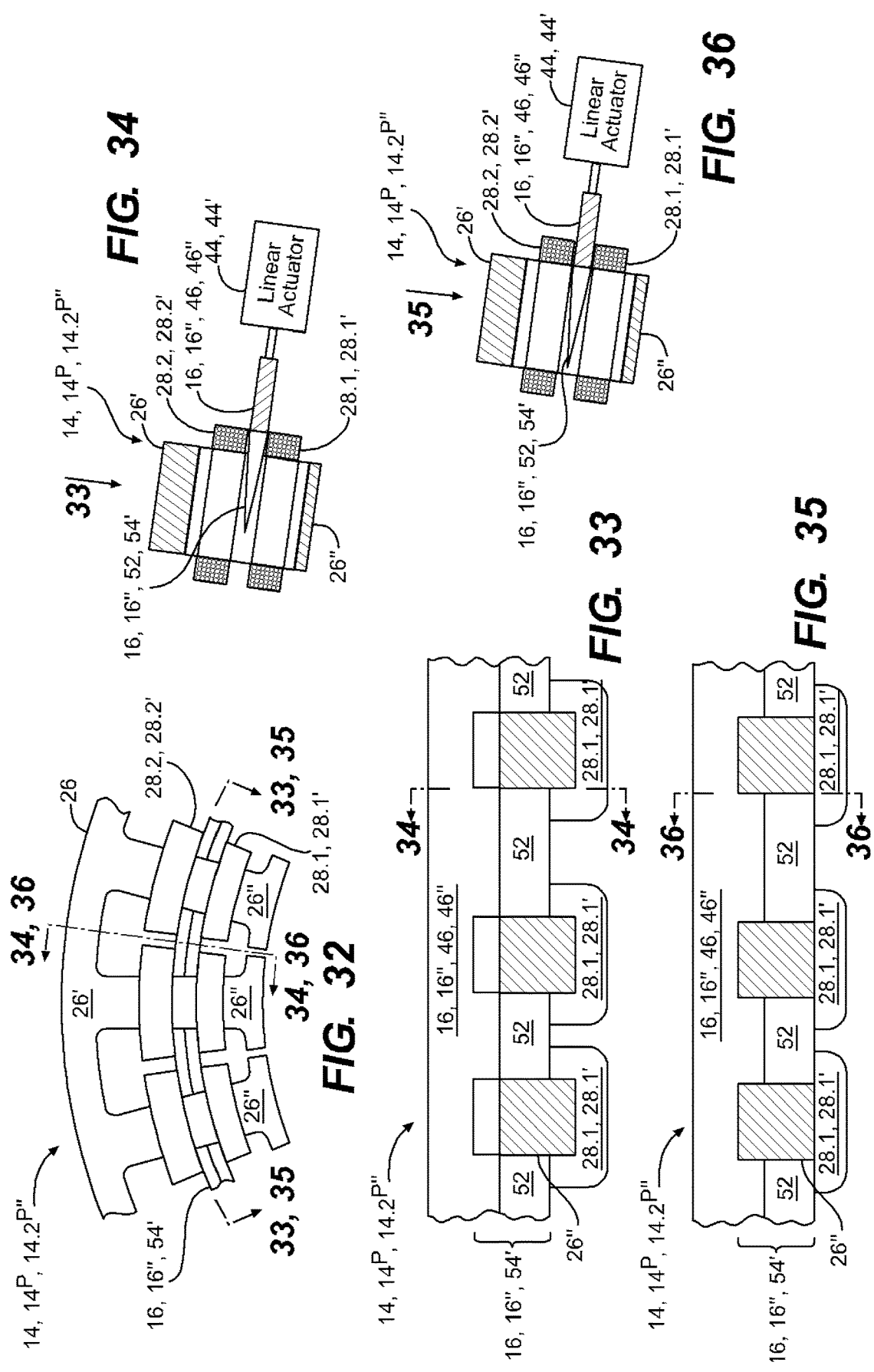

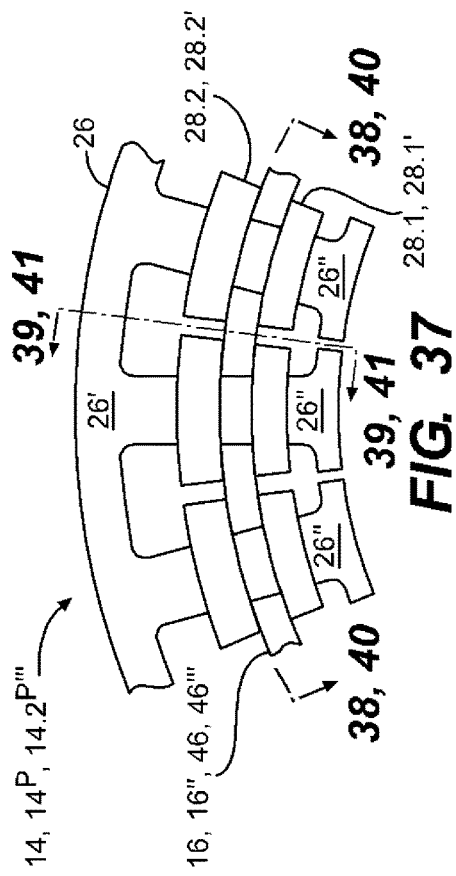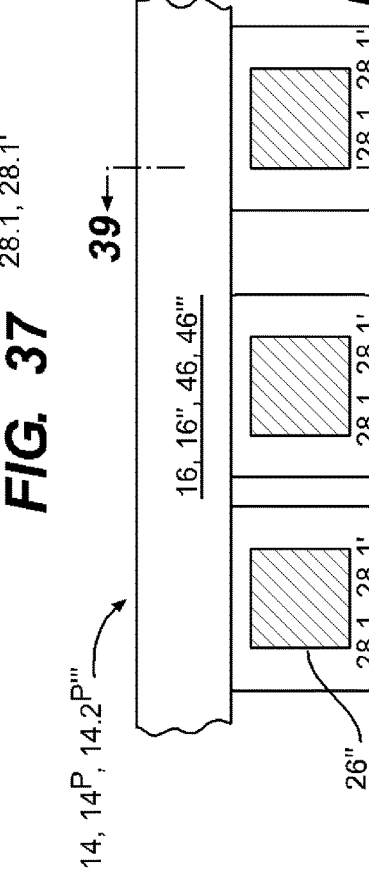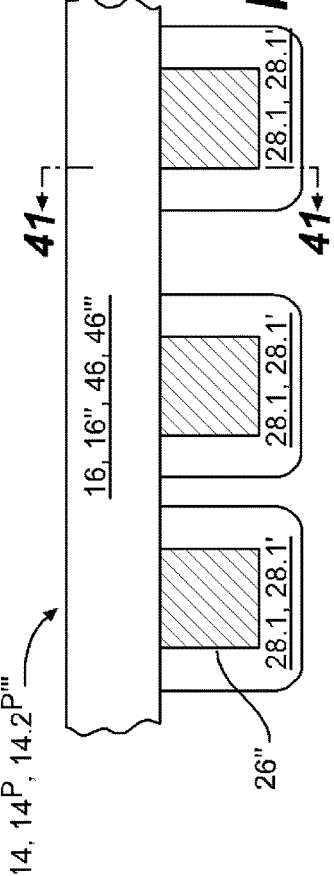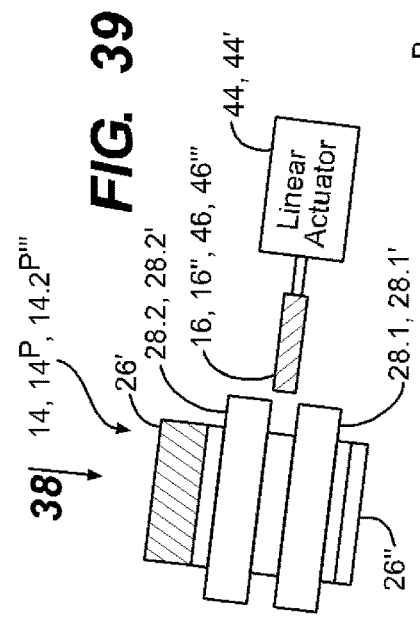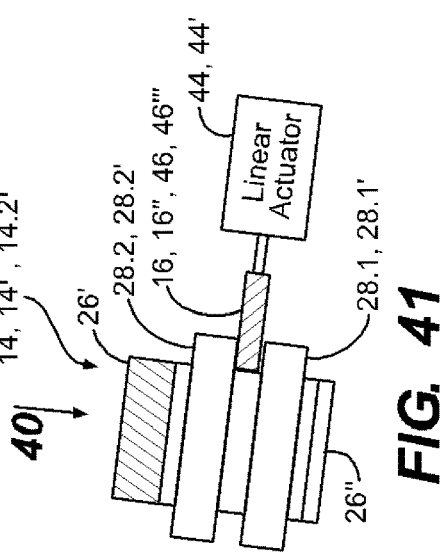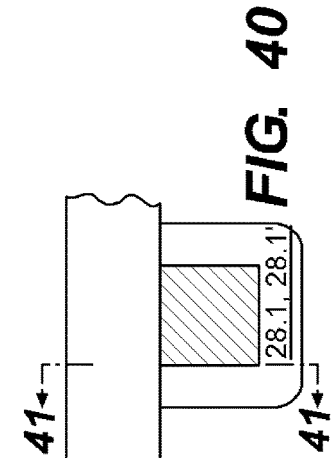

US 10,944,302 B2

PERMANENT-MAGNET GENERATOR INCORPORATING A VARIABLE-RELUCTANCE STATOR SYSTEM

CROSS-REFERENCE TO RELATED APPLICATIONS

The instant application claims the benefit of prior U.S. Provisional Application Ser. No. 62/655,176 filed on 9 Apr. 2018, which is incorporated herein by reference in its entirety.

BRIEF DESCRIPTION OF THE DRAWINGS

In the accompanying drawings:

FIG. 11 illustrates a side view of an embodiment of a stator portion of a permanent-magnet generator in accordance with the second class of the first aspect of the variable-reluctance stator;

FIG. 12 illustrates a fragmentary, circumferentially-developed, radially-directed view of the embodiment of the stator portion of the permanent-magnet generator illustrated in FIG. 11, in accordance with the second class, first aspect variable-reluctance stator, viewed from the outside thereof;

FIG. 13 illustrates a radial cross-sectional view of a variable-reluctance portion of the stator portion of the permanent-magnet generator illustrated in FIGS. 11 and 12, in accordance with the second class, first aspect variable-reluctance stator;

FIG. 18 illustrates a side view of a first embodiment of a stator portion of a permanent-magnet generator in accordance with the second class of the second aspect of the variable-reluctance stator;

FIG. 19 illustrates a fragmentary, circumferentially-developed, radially-directed cross-sectional view of the first embodiment of the stator portion of the permanent-magnet generator illustrated in FIG. 18, in accordance with the second class, second aspect variable-reluctance stator, viewed toward the inside thereof;

FIG. 20 illustrates a radial cross-sectional view of a variable-reluctance portion of the stator portion of the permanent-magnet generator illustrated in FIGS. 18 and 19, in accordance with the second class, second aspect, variable-reluctance stator;

FIG. 21 illustrates a fragmentary axial cross-sectional view through a variable-reluctance portion of the stator portion illustrated in FIGS. 18-20, which includes both a corresponding fixed-reluctance portion of the stator and corresponding associated moveable magnetically-permeable elements of the variable-reluctance portion of the stator, for the second class, second aspect variable-reluctance stator;

FIG. 22 illustrates a side view of a second embodiment of a stator portion of a permanent-magnet generator in accordance with the first class of the second aspect of the variable-reluctance stator;

FIG. 23 illustrates a fragmentary, circumferentially-developed, radially-directed cross-sectional view of the second embodiment of the stator portion of the permanent-magnet generator illustrated in FIG. 22, in accordance with the first class, second aspect variable-reluctance stator, viewed toward the outside thereof, with the associated variable-reluctance element not in abutment with the stator core;

FIG. 24 illustrates a radial cross-sectional view of a variable-reluctance portion of the stator portion of the permanent-magnet generator illustrated in FIGS. 22 and 23, in accordance with the first class, second aspect variable-reluctance stator, with the associated variable-reluctance element not in abutment with the stator core;

FIG. 25 illustrates a fragmentary, circumferentially-developed, radially-directed cross-sectional view of the second embodiment of the stator portion of the permanent-magnet generator illustrated in FIG. 22, in accordance with the first class, second aspect variable-reluctance stator, viewed toward the outside thereof, with the associated variable-reluctance element in abutment with the stator core;

FIG. 26 illustrates a radial cross-sectional view of a variable-reluctance portion of the stator portion of the permanent-magnet generator illustrated in FIGS. 22 and 25, in accordance with the first class, second aspect variable-reluctance stator, with the associated variable-reluctance element in abutment with the stator core;

FIG. 27 illustrates a side view of a third embodiment of a stator portion of a permanent-magnet generator in accordance with the first class of the second aspect of the variable-reluctance stator;

FIG. 28 illustrates a fragmentary, circumferentially-developed, radially-directed cross-sectional view of the third embodiment of the stator portion of the permanent-magnet generator illustrated in FIG. 27, in accordance with the first class, second aspect variable-reluctance stator, viewed toward the outside thereof, with the associated variable-reluctance element not in abutment with the stator core;

FIG. 29 illustrates a radial cross-sectional view of a variable-reluctance portion of the stator portion of the permanent-magnet generator illustrated in FIGS. 27 and 28, in accordance with the first class, second aspect variable-reluctance stator, with the associated variable-reluctance element not in abutment with the stator core;

FIG. 30 illustrates a fragmentary, circumferentially-developed, radially-directed cross-sectional view of the third embodiment of the stator portion of the permanent-magnet generator illustrated in FIG. 27, in accordance with the first class, second aspect variable-reluctance stator, viewed toward the outside thereof, with the associated variable-reluctance element in abutment with the stator core;

FIG. 31 illustrates a radial cross-sectional view of a variable-reluctance portion of the stator portion of the permanent-magnet generator illustrated in FIGS. 27 and 30, in accordance with the first class, second aspect variable-reluctance stator, with the associated variable-reluctance element in abutment with the stator core;

FIG. 32 illustrates a side view of a second embodiment of a stator portion of a permanent-magnet generator in accordance with the second class of the second aspect of the variable-reluctance stator;

FIG. 33 illustrates a fragmentary, circumferentially-developed, radially-directed cross-sectional view of the second embodiment of the stator portion of the permanent-magnet generator illustrated in FIG. 32, in accordance with the second class, second aspect variable-reluctance stator, viewed toward the inside thereof, with the associated variable-reluctance element not in abutment with the stator core;

FIG. 34 illustrates a radial cross-sectional view of a variable-reluctance portion of the stator portion of the second embodiment of the stator portion of the permanent-magnet generator illustrated in FIGS. 32 and 33, in accordance with the second class, second aspect variable-reluctance stator, with the associated variable-reluctance element not in abutment with the stator core;

FIG. 35 illustrates a fragmentary, circumferentially-developed, radially-directed cross-sectional view of the second embodiment of the stator portion of the permanent-magnet generator illustrated in FIG. 32, in accordance with the second class, second aspect variable-reluctance stator, viewed toward the inside thereof, with the associated variable-reluctance element in abutment with the stator core;

FIG. 36 illustrates a radial cross-sectional view of a variable-reluctance portion of the stator portion of the second embodiment of the stator portion of the permanent-magnet generator illustrated in FIGS. 32 and 35, in accordance with the second class, second aspect variable-reluctance stator, with the associated variable-reluctance element in abutment with the stator core;

FIG. 37 illustrates a side view of a third embodiment of a stator portion of a permanent-magnet generator in accordance with the second class of the second aspect of the variable-reluctance stator;

FIG. 38 illustrates a fragmentary, circumferentially-developed, radially-directed cross-sectional view of the third embodiment of the stator portion of the permanent-magnet generator illustrated in FIG. 37, in accordance with the second class, second aspect variable-reluctance stator, viewed toward the inside thereof, with the associated variable-reluctance element not in abutment with the stator core;

FIG. 39 illustrates a radial cross-sectional view of a variable-reluctance portion of the stator portion of the third embodiment of the stator portion of the permanent-magnet generator illustrated in FIGS. 37 and 38, in accordance with the second class, second aspect variable-reluctance stator, with the associated variable-reluctance element not in abutment with the stator core;

FIG. 40 illustrates a fragmentary, circumferentially-developed, radially-directed cross-sectional view of the third embodiment of the stator portion of the permanent-magnet generator illustrated in FIG. 37, in accordance with the second class, second aspect variable-reluctance stator, viewed toward the inside thereof, with the associated variable-reluctance element in abutment with the stator core;

FIG. 41 illustrates a radial cross-sectional view of a variable-reluctance portion of the stator portion of the third embodiment of the stator portion of the permanent-magnet generator illustrated in FIGS. 37 and 40, in accordance with the second class, second aspect variable-reluctance stator, with the associated variable-reluctance element in abutment with the stator core;

DESCRIPTION OF EMBODIMENT(S)

Figure 1:
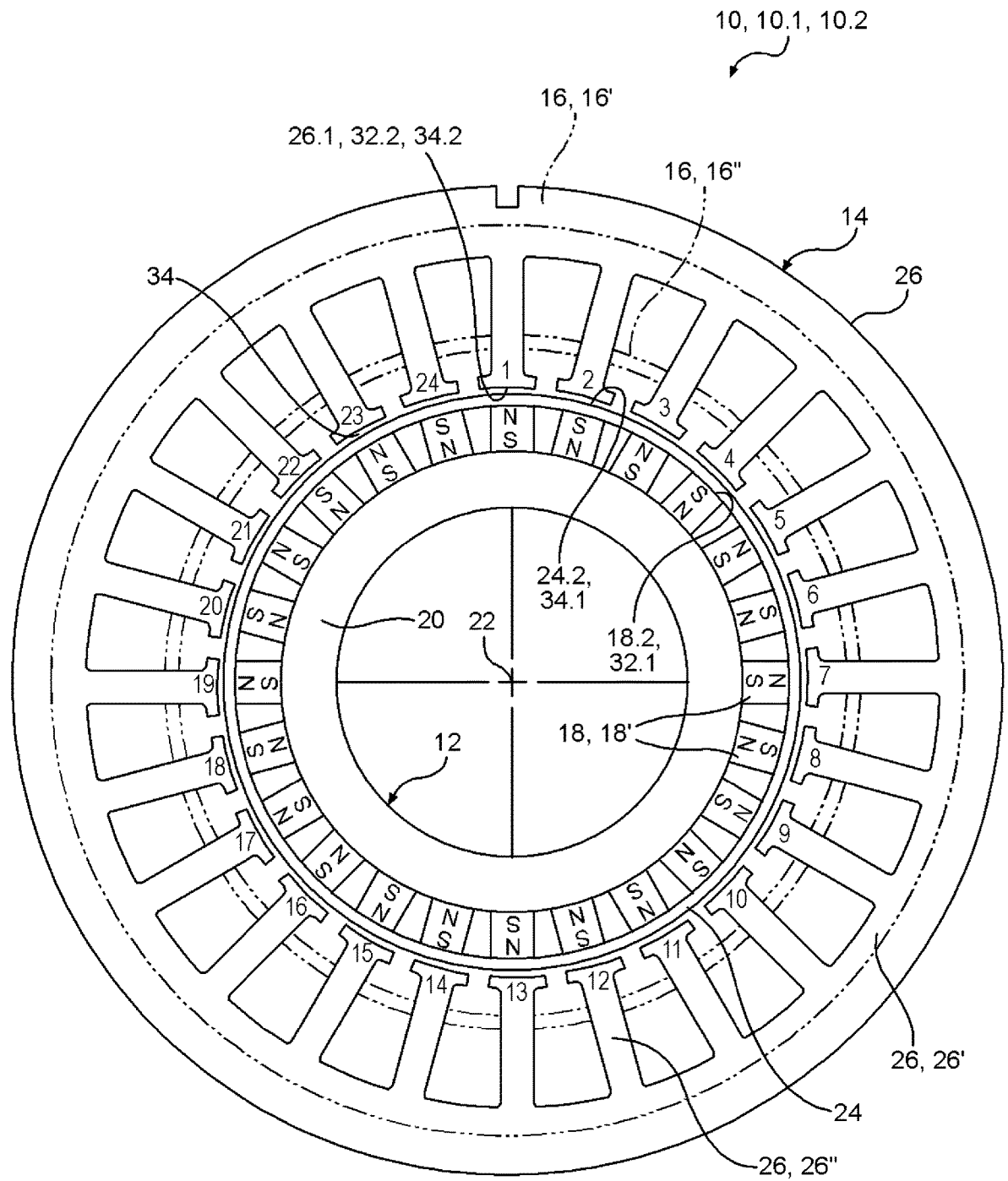
FIG. 1 illustrates a permanent-magnet generator with an associated variable-reluctance stator (without the associated stator windings/coils, for clarity), wherein the variable-reluctance stator schematically illustrates both a first aspect that provides for controlling a reluctance in a series element of the reluctance loop that controls the magnetic flux linking with one or more stator windings/coils, and a second aspect that provides for controllably shunting magnetic flux from linking with at least one stator winding/coil of the stator.

Referring to FIGS. 1 through 6B, a permanent-magnet generator 10 incorporates a rotor 12 and a variable-reluctance stator 14, wherein the variable-reluctance stator 14 incorporates one or more variable-reluctance elements 16 that provide for regulating the magnitude of the output voltage of the permanent-magnet generator 10 generated responsive to a rotation of the rotor 12, so as to provide for compensating for the effects of either the rotational speed of the rotor 12, the load current, or temperature, upon the peak output voltage $V_{MAX}$. Absent an associated compensation system—for example, as provided for by the variable-reluctance stator 14 in cooperation with an associated control system,—the voltage output of the permanent-magnet generator 10 would tend to increase with rotational speed, and decrease with load current.

The rotor 12 incorporates an even plurality of radial-flux permanent magnets 18, for example, rare-earth permanent magnets 18', disposed around the circumference of an associated magnetically-permeable rotor yoke 20, with equiangular circumferential spacing with respect to the rotational axis 22 of the rotor 12, with the N-S axis of each permanent magnet 18, 18' radially-oriented, but with circumferentially-adjacent permanent magnets 18 having relatively-opposite magnetic polarity, i.e. with the North (N) and South (S) poles reversed with respect to one another. In one set of embodiments, the permanent magnets 18 are rare-earth permanent magnets 18' having a relatively-high energy product and with a relatively-high Curie temperature, for example, in one set of embodiments, constructed of either a Samarium-Cobalt (Sm—Co) or a Neodymium-Iron-Boron material. The plurality of permanent magnets 18, 18' are retained on the magnetically-permeable rotor yoke 20 by a non-magnetic magnet-retaining ring 24. In one set of embodiments, the outboard surfaces 18.2 of the permanent magnets 18, 18' are formed or ground so that the composite of the plurality of permanent magnets 18, 18' has cylindrical curvature so as to provide for accommodating the non-magnetic magnet-retaining ring 24 without diminishing the hoop strength thereof, the latter of which provides sufficient hoop strength to retain the permanent magnets 18, 18' if the latter are subjected to relatively high centrifugal forces at the relatively-high rotational and associated surface speeds during operation of the permanent-magnet generator 10. For example, in one set of embodiments, the non-magnetic magnet-retaining ring 24 is constructed of a composite material with a relatively-high strength-to-weight ratio, for example, but not limited to: carbon fiber and epoxy resin, e.g. with a wound carbon fiber ring installed (either wound on, or installed after preforming on a mandrel) around the magnetically-permeable rotor yoke 20 after attaching the permanent magnets 18, 18' thereto. Additional options for the non-magnetic magnet-retaining ring 24 are Inconel® 718, or titanium.

In accordance with one set of embodiments, the variable-reluctance stator 14 comprises a laminated stator core 26 comprising a continuous stator back-iron portion 26' from which depend—radially-inward therefrom—a plurality of stator teeth 26" around which are wound corresponding stator windings/coils 28. Each stator winding/coil 28 defines a corresponding pole 30 of the permanent-magnet generator 10, that cooperates with the associated stator windings/coils 28 to provide for generating the output voltage and associated power from the permanent-magnet generator 10. For example, in one set of embodiments, the laminations of the laminated stator core 26 are constructed of a relatively-highly-magnetically-permeable material capable of operation at relatively-high temperatures, for example, a 3% Silicon steel, for example, with inter-laminar surface coatings or treatments to mitigate against eddy-current conduction between laminar layers.

In one set of embodiments, the outboard surfaces 18.2 of each of the permanent magnets 18, 18' conform to an underlying first cylindrical surface—centered about the rotational axis 22 of the rotor 12—that defines an inboard boundary 32.1 of an effective air gap 32 of the associated magnetic circuit of the permanent-magnet generator 10. The outboard surface 24.2 of the non-magnetic magnet-retaining ring 24 conforms to an underlying second cylindrical surface—concentric with the first cylindrical surface—that defines an inboard boundary 34.1 of a physical rotor/stator air gap 34. The inboard surface 26.1 of the laminated stator core 26 conforms to an underlying third cylindrical surface—concentric with the first and second cylindrical surfaces—that defines both an outboard boundary 32.2 of the effective air gap 32 and an outboard boundary 34.2 of the physical rotor/stator air gap 34. The effective air gap 32 is the radial thickness of the non-magnetic layer between the outboard surfaces 18.2 of the permanent magnets 18, 18' and the inboard surface 26.1 of the laminated stator core 26, which includes both the physical rotor/stator air gap 34 and the radial thickness of the non-magnetic magnet-retaining ring 24 beyond the outboard surfaces 18.2 of the permanent magnets 18, 18'. In one set of embodiments, given the packaging constraints of the permanent-magnet generator 10, the radial length (i.e. thickness) of the permanent magnets 18, 18' is less than the length of the effective air gap 32. Although the power-generating capacity of a radial permanent-magnet generator is typically directly related to the ratio of the length (i.e. radial length along N-S axis) of the associated permanent magnets 18, 18' to the length (i.e. radial length) of the associated effective air gap 32—and also proportional to the transverse area of the permanent magnets 18, 18' (i.e. transverse to the N-S axis),—in some embodiments, the permanent-magnet generator 10 can be operated at sufficiently high circumferential surface speeds (i.e. surface speed=radius times radian rotational velocity) to overcome an otherwise limiting effect of the relatively large effective air gap 32 in relation to the radial length of the permanent magnets 18, 18'. For a given circumferential, or chordal, magnet size, the maximum number of permanent magnets 18, 18' is dependent upon the diameter of the magnetically-permeable rotor yoke 20. For example, in one set of embodiments, the number of permanent magnets 18, 18' is even, for example, between 4 and 32, with the permanent magnets 18, 18' evenly spaced around the circumference of the rotor 12.

In some embodiments, and all the embodiments illustrated herein, the radially-inboard ends of the stator teeth 26" incorporate circumferentially-extending flange portions 35 that define the circumferential span of the associated effective air gap 32, and—possibly but not necessarily in cooperation with associated non-magnetic, flexible slot retainers installed between adjacent stator teeth 26" radially inboard thereof—provide for mechanically retaining the stator windings/coils 28 within the slots of the laminated stator core 26.

Although each of FIGS. 1-5 illustrate a single-phase permanent-magnet generator 10, for which there is a stator winding/coil 28 about each stator tooth 26", for which the number of permanent magnets 18, 18'—each defining a corresponding pole 30—is the same as the number of poles 30, it should be understood that the number of poles 30, the number of phases, number of stator teeth 26" per stator winding/coil 28 or per circumferential extent of each permanent magnet 18, 18', or the number of stator windings/coils 28 associated with each stator tooth 26", is not limiting. For example, an M-phase output would be provided if the circumferential extent of each permanent magnet 18, 18' spanned M stator teeth 26", with each stator tooth 26" incorporating a separate stator winding/coil 28. Alternatively, each stator winding/coil 28 could span multiple stator teeth 26", with stator windings/coils 28 of adjacent poles 30 staggered, but in partial-overlapping relationship, with respect to one another.

For the single-phase configurations illustrated in FIGS. 1-5, with the rotor 12 and variable-reluctance stator 14 aligned with respect to one another so that each permanent magnet 18, 18' is aligned with a corresponding stator tooth 26" at a first position, the magnitude of the magnetic flux Φ (i.e. the number of lines of flux, measured in Webers) is at a peak level within each stator tooth 26", at a first polarity. With the rotor 12 rotated by the angular extent of one permanent magnet 18, 18' spacing to a second position, so that each permanent magnet 18, 18' is aligned with a corresponding stator tooth 26", but with the N-S polarities of the permanent magnets 18, 18' reversed from that shown in FIGS. 1-5, the magnitude of the magnetic flux Φ is at the same peak level within each stator tooth 26" as for the illustrated position, but at a second polarity that is reversed with respect to the first polarity. With the rotor 12 rotated by an additional angular extent of one permanent magnet 18, 18' spacing to a third position, with the rotor 12 and variable-reluctance stator 14 again aligned as illustrated in FIGS. 1-5, the magnitude of the magnetic flux Φ is again at the same peak level within each stator tooth 26", at the first polarity. At approximate half-way intermediate rotational positions of the rotor 12, the magnetic flux Φ within each stator tooth 26" is substantially null. Accordingly, as the rotor 12 rotates with respect to the variable-reluctance stator 14 from the first to the third positions, the magnetic flux Φ within each stator tooth 26" advances through a single cycle. In accordance with Faraday's Law, the magnitude of the output voltage v of each N-turn stator winding/coil 28 is responsive to the rate at which this occurs, i.e.:

$$v = N \frac{d\Phi}{dt} \quad (1)$$

wherein the rate of change $$\frac{d\Phi}{dt}$$

of magnetic flux Φ is responsive to both the rotational speed ω (in radians/sec.) of the rotor 12, and to magnetic flux Φ(θ) as a function of rotation angle θ, as follows:

$$\frac{d\Phi}{dt} = \frac{d\Phi(\theta)}{d\theta} \cdot \frac{d\theta}{dt} = \frac{d\Phi(\theta)}{d\theta} \cdot \omega, \quad (2)$$

wherein the shape of the magnetic flux function Φ(θ) with respect to rotation angle θ is dependent upon the geometry of the permanent magnets 18, 18' of the rotor 12, and the geometry of the stator teeth 26" of the variable-reluctance stator 14; and the corresponding peak magnitude of magnetic flux Φ is responsive to the following: the magnetmotive force $\mathcal{F}_m$ of the associated permanent magnet 18, 18', the back electromotive force (emf) N·i of the stator winding/coil 28 as a result of associated load current i, and the reluctance $\mathcal{R}$ of the associated magnetic circuit, as follows:

$$\Phi = \frac{\mathcal{F}_m - Ni}{\mathcal{R}}. \quad (3)$$

The associated magnetic circuit includes a) both the stator back-iron portion 26' and the associated stator teeth 26", b) the effect thereupon of the associated one or more variable-reluctance elements 16, c) the permanent magnets 18, 18', d) the effective air gap 32, and e) the magnetically-permeable rotor yoke 20, the reluctance $\mathcal{R}$ of which can be modeled as:

$$\mathcal{R} = \mathcal{R}_G + \mathcal{R}_S + \mathcal{R}_M + \mathcal{R}_{ROTOR} \quad (4)$$

where $\mathcal{R}_G$ is the reluctance of the effective air gap 32, $\mathcal{R}_M$ is the reluctance of the permanent magnets 18, 18', $\mathcal{R}_{ROTOR}$ is the reluctance of the rotor 12, and $\mathcal{R}_S$ is the reluctance of the variable-reluctance stator 14 as affected by the one or more variable-reluctance elements 16, wherein the reluctance $\mathcal{R}$ of the remaining elements of the magnetic circuit as assumed to be negligible in comparison with that of either the effective air gap 32 or the variable-reluctance stator 14.

Generally, the reluctance $\mathcal{R}_G$, $\mathcal{R}_S$, $\mathcal{R}_M$ of any portion of the magnetic circuit is given by (with X corresponding to either "G", "M", or "S"):

$$\mathcal{R}_X = \frac{\ell_X}{\mu_X A_X} \quad (5)$$

wherein $l_X$ is the associated length thereof, $A_X$ is the associated area thereof through which the magnetic flux Φ passes, and $\mu_X$ is the associated magnetic permeability.

Referring again to FIGS. 1-5, each of the one or more variable-reluctance elements 16 are implemented as either a moveable magnetically-permeable series element 16, 16' in the associated magnetic circuit that is in series with the magnetic flux Φ generated by one or more of the permanent magnets 18, 18', thereby providing for regulating the peak magnitude of magnetic flux $\Phi_{Coil}$ therein; or a moveable magnetically-permeable shunt element 16, 16" that provides for shunting a portion of the magnetic flux Φ generated by one or more of the permanent magnets 18 that would otherwise interact with a corresponding one or more stator windings/coils 28, thereby providing for reducing the voltage generated thereby responsive to the time variation of the magnetic flux Φ.

Figure 2:
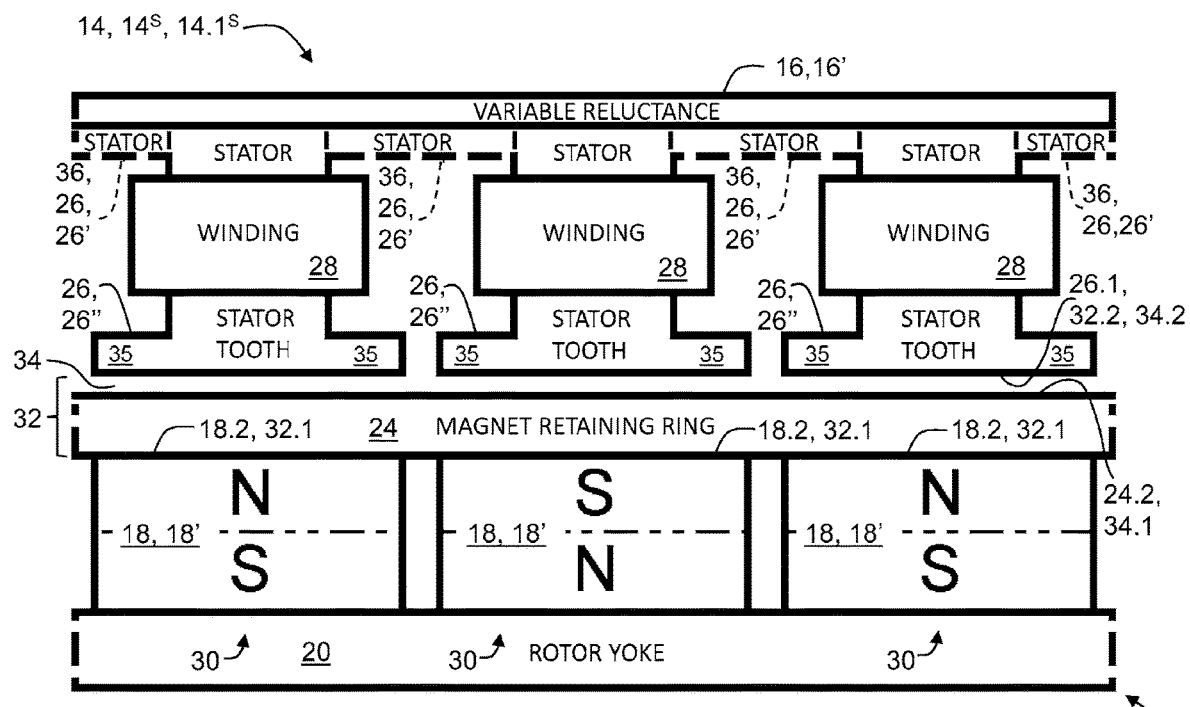
FIG. 2 illustrates a schematic fragmentary developed side view of rotor and stator portions of a permanent-magnetic generator incorporating a first class of a first aspect of a variable-reluctance stator.
Figure 3:
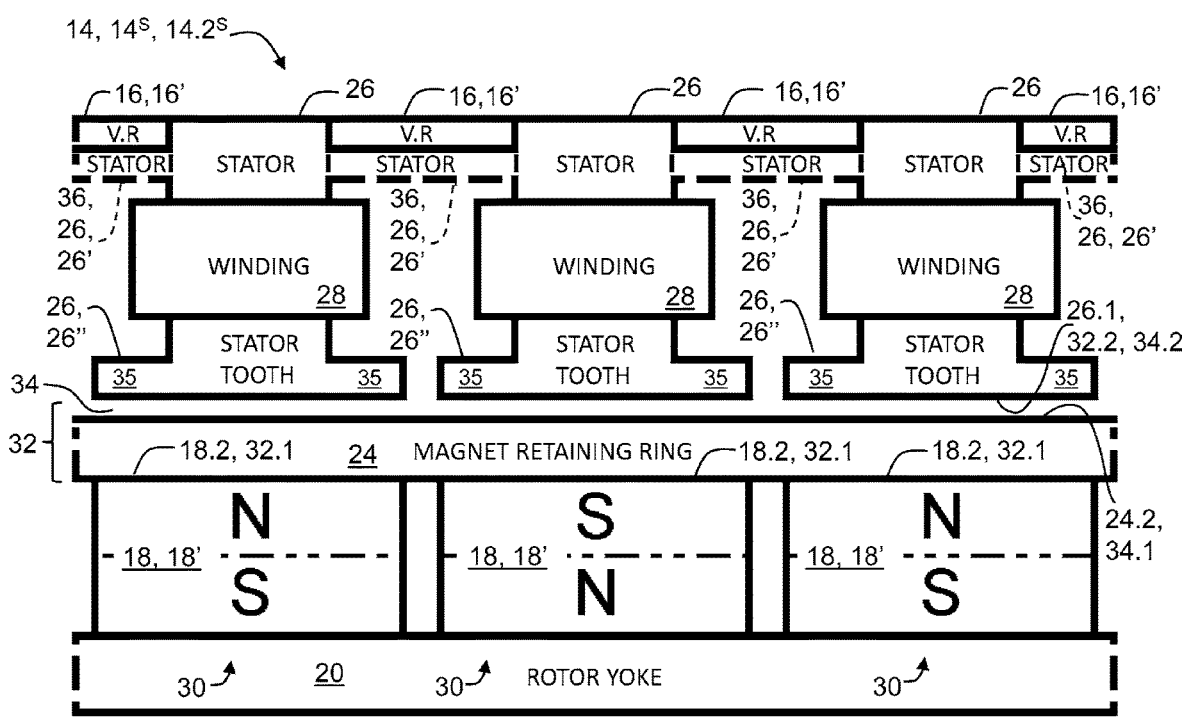
FIG. 3 illustrates a schematic fragmentary developed side view of rotor and stator portions of a permanent-magnetic generator incorporating a second class of the first aspect of a variable-reluctance stator.

More particularly, FIGS. 2 and 3 respectively illustrate a first class 14.1$^S$ and a second class 14.2$^S$ of a first aspect 14$^S$ of a variable-reluctance stator 14, wherein the stator back-iron portion 26' comprises a moveable magnetically-permeable series element 16, 16' that is possibly in cooperation with a circumferentially-extending fixed magnetically-permeable series element 36 that is either continuous or segmented, wherein a first portion of the magnetic flux $\Phi_{Fixed}$ passes through the fixed stator back-iron portion 26' (if present), and a second portion of the magnetic flux $\Phi_{Variable}$ passes through the moveable magnetically-permeable series element 16, 16'. In accordance with the first class, first aspect, variable-reluctance stator 14, 14.1$^S$ illustrated in FIG. 2, the moveable magnetically-permeable series element 16, 16' is circumferentially continuous, and in accordance with the second class, first aspect, variable-reluctance stator 14, 14.2$^S$ illustrated in FIG. 3, the moveable magnetically-permeable series element 16, 16' is circumferentially segmented between radial extensions of the associated stator teeth 26".

Figure 4:
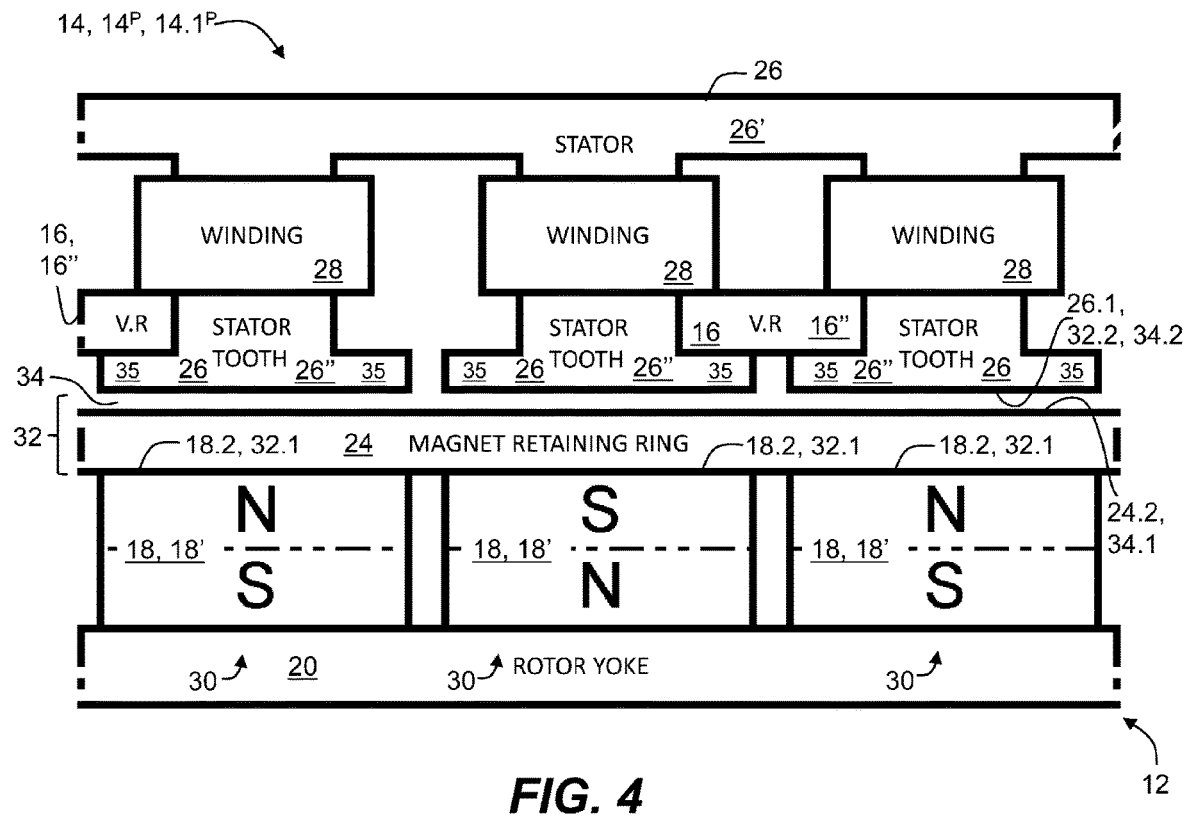
FIG. 4 illustrates a schematic fragmentary developed side view of rotor and stator portions of a permanent-magnetic generator incorporating a first class of a second aspect of a variable-reluctance stator.
Figure 5:
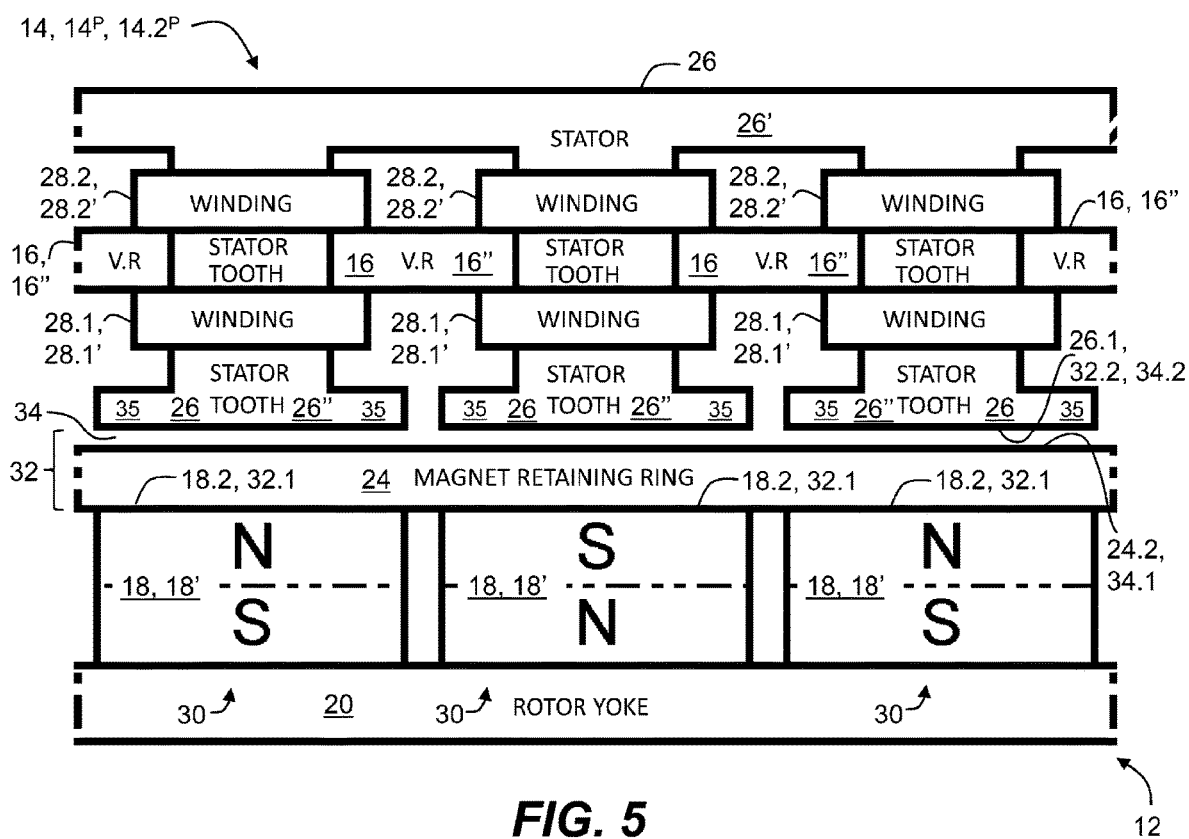
FIG. 5 illustrates a schematic fragmentary developed side view of rotor and stator portions of a permanent-magnetic generator incorporating a second class of the second aspect of a variable-reluctance stator.

Furthermore, FIGS. 4 and 5 respectively illustrate a first class 14.1$^P$ and a second class 14.2$^P$ of a second aspect 14$^P$ of a variable-reluctance stator 14, wherein the variable-reluctance stator 14 incorporates one or more moveable magnetically-permeable shunt elements 16, 16" that provide for shunting a portion of the magnetic flux Φ from interacting with corresponding associated one or more stator windings/coils 28. In accordance with the first class, second aspect, variable-reluctance stator 14, 14.1$^P$ illustrated in FIG. 4, the moveable magnetically-permeable shunt elements 16, 16" provide for magnetically-coupling adjacent stator teeth 26" at a location that is radially-inboard of the stator windings/coils 28 associated therewith, so that when a pair of adjacent stator teeth 26" are magnetically-shunted by the associated moveable magnetically-permeable shunt element 16, 16", at least a portion of the magnetic flux Φ generated by permanent magnets 18, 18' interacting therewith will be shunted through the moveable magnetically-permeable shunt element 16, 16", rather than passing through the associated stator windings/coils 28.

In accordance with the second class, second aspect, variable-reluctance stator 14, 14.2$^P$ illustrated in FIG. 5, each stator winding/coil 28 on a particular stator tooth 26", or set of stator teeth 26", is split into either corresponding separate first 28.1 and second 28.2 stator windings/coils, or separated but interconnected first 28.1' and second 28.2' stator winding/coil portions of the same stator winding/coil 28, wherein the first 28.1 and second 28.2 stator windings/coils or first 28.1' and second 28.2' stator winding/coil portions are radially displaced from one another along the particular stator tooth 26", or set of stator teeth 26", with the total number of turns N divided thereamongst and a moveable magnetically-permeable shunt element 16, 16" between each adjacent pair of stator teeth 26" at locations that are radially-in-between each pair of first 28.1 and second 28.2 stator windings/coils or first 28.1' and second 28.2' stator winding/coil portions associated therewith, so that when a pair of adjacent stator teeth 26" are magnetically-shunted by the associated moveable magnetically-permeable shunt element 16, 16", at least a portion of the magnetic flux Φ generated by permanent magnets 18, 18' interacting therewith will be shunted through the moveable magnetically-permeable shunt element 16, 16", rather than passing through the associated radially-outermost second stator winding/coil 28.2 or second stator winding/coil portion 28.2'. Accordingly, when the moveable magnetically-permeable shunt element 16, 16" is positioned so as to provide for relatively-minimum reluctance $\mathcal{R}$ between an adjacent pair of stator teeth 26", the radially-innermost first stator winding/coil 28.1 or first stator winding/coil portion 28.1' will receive the full amount of magnetic flux Φ, but, having less than the full number N of turns, will generate a relatively lower voltage magnitude than would a stator winding/coil 28 with N turns, whereas the radially-outermost second stator winding/coil 28.2 or second stator winding/coil portion 28.2' will receive substantially less magnetic flux Φ, so that the voltage generated thereby, if any, will be substantially lower in magnitude than otherwise possible, wherein the combined voltage from both the first 28.1 and second 28.2 stator windings/coils, or the first 28.1' and second 28.2' stator winding/coil portions, will be lower than without the presence of the moveable magnetically-permeable shunt element 16, 16".

Figure 6A:
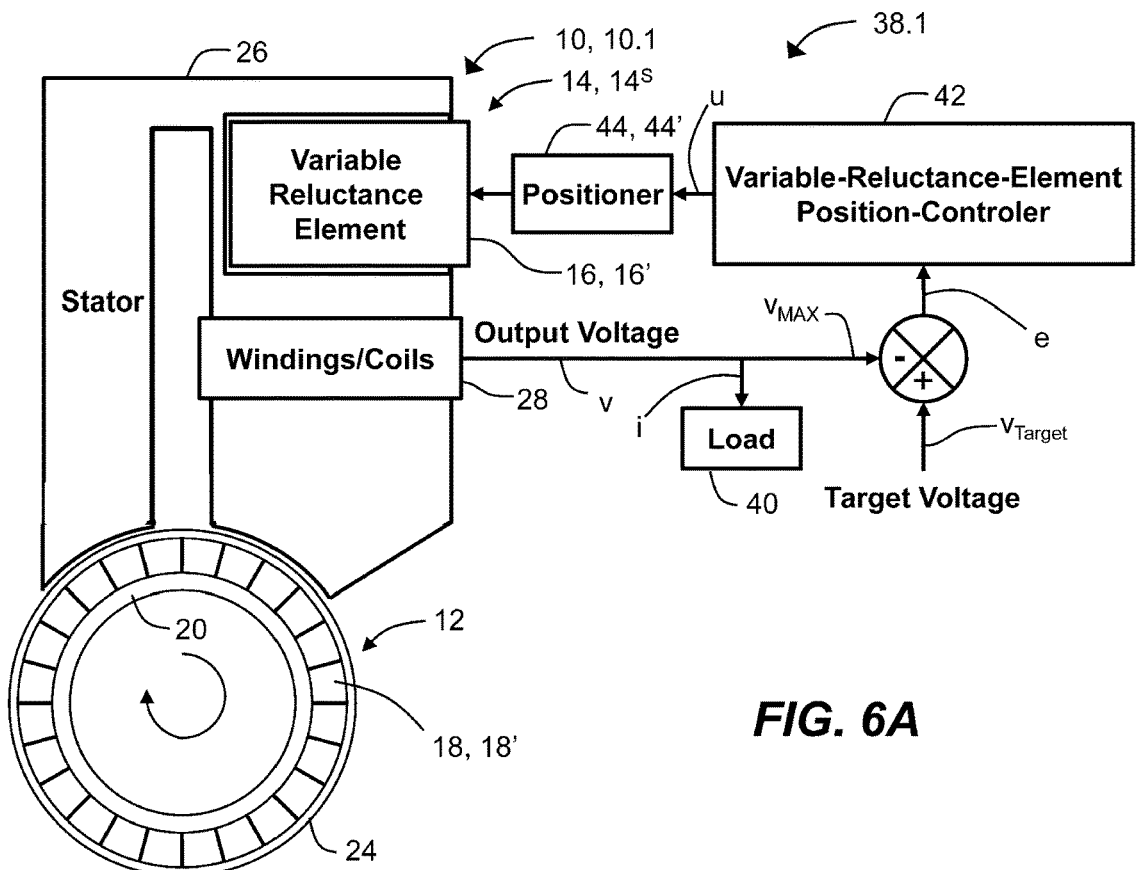
FIG. 6A illustrates a block diagram of a first aspect of a system for controlling the output voltage of a first aspect permanent-magnet generator by positioning a moveable magnetically-permeable series element of an associated variable-reluctance stator.

Referring to FIG. 6A in view of FIGS. 2 and 3, a first aspect of a control system 38.1 that provides for controlling the output voltage of a first aspect 10.1 of a permanent-magnet generator 10, 10.1 incorporating a first aspect variable-reluctance stator 14, 14$^S$—comprising a moveable magnetically-permeable series element 16, 16' in series with the magnetic circuit of an associated laminated stator core 26,—provides for regulating the output voltage v of the associated stator windings/coils 28 by controlling the position of the moveable magnetically-permeable series element 16, 16', which in turn controls the peak magnitude of magnetic flux $\tilde{\Phi}_{Coil}$ through the stator windings/coils 28. More particularly, with the rotor 12 of the first aspect permanent-magnet generator 10, 10.1 rotating, the peak magnitude of magnetic flux $\tilde{\Phi}_{Coil}$ within the laminated stator core 26 is responsive to the total reluctance $\mathcal{R}$ of the associated magnetic circuit, which is in turn responsive to the position of the moveable magnetically-permeable series element 16, 16' relative to the laminated stator core 26. The output voltage v of each associated stator winding/coil 28 is responsive to the following: a) the total reluctance $\mathcal{R}$ of the corresponding associated magnetic circuit; b) the rotational speed ω of the rotor 12, and c) the load current i in the stator winding/coil 28 responsive to an associated electrical load 40. Accordingly, an associated variable-reluctance-element position-controller 42 provides for generating a position-control signal u that is input to an associated positioner 44—for example, a linear actuator 44, 44' as illustrated below—operatively coupled to the moveable magnetically-permeable series element 16, 16'. The positioner 44, 44' provides for moving the moveable magnetically-permeable series element 16, 16' relative to the laminated stator core 26 so as to provide for changing the reluctance $\mathcal{R}_s$ of the variable-reluctance stator 14 element of the core loop that is in series with the core surrounded by the stator windings/coils 28. The position-control signal u generated by the variable-reluctance-element position-controller 42 is responsive to an error signal e, the latter of which is responsive to the difference between a target voltage level $V_{TARGET}$ and the peak output voltage $V_{MAX}$ of the stator windings/coils 28, so as to provide for regulating the peak output voltage $V_{MAX}$ to be substantially at the target voltage level $V_{TARGET}$, and to provide for driving the error signal e towards zero, which provides for compensating for the effects of either changes in the rotational speed ω of the rotor 12, or changes in the amount of load current i in the stator winding/coil 28 responsive to demand from an associated electrical load 40.

Figure 6B:
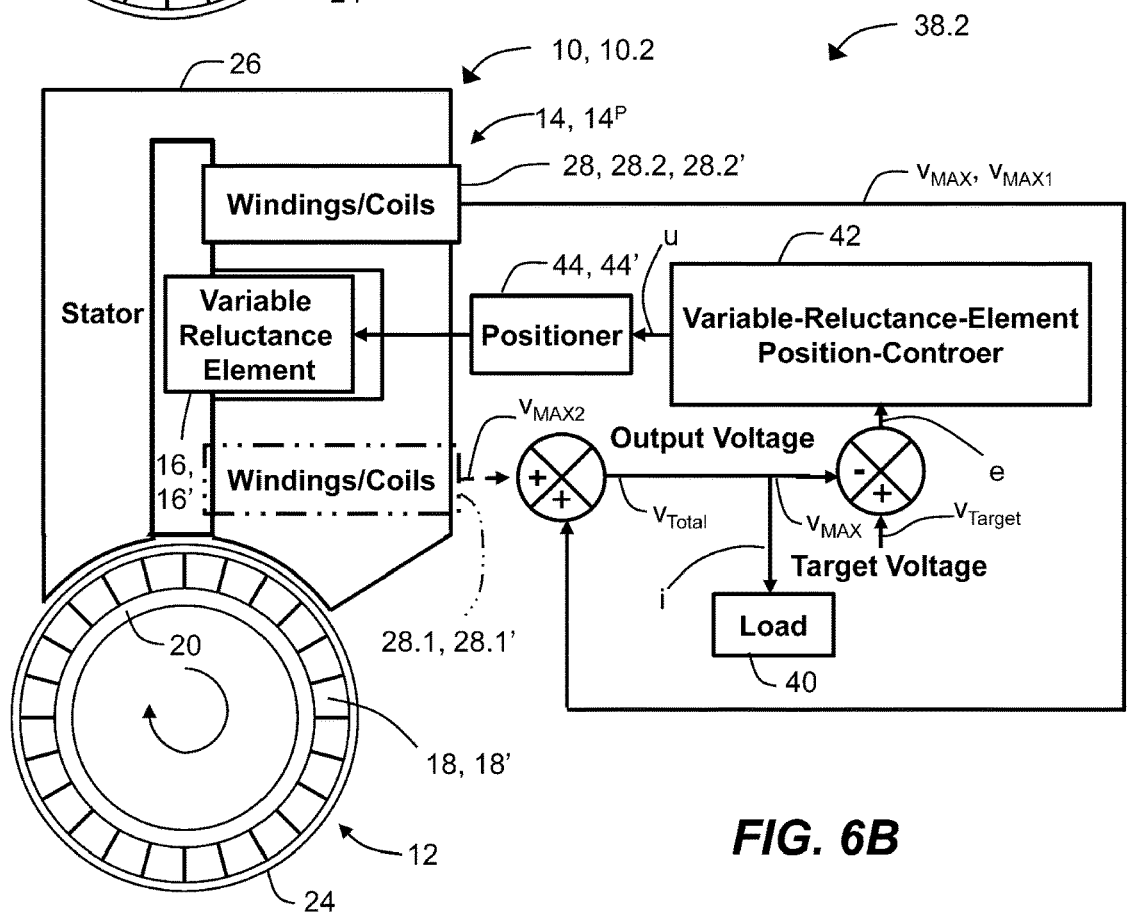
FIG. 6B illustrates a block diagram of a first aspect of a system for controlling the output voltage of a second aspect permanent-magnet generator by positioning a moveable magnetically-permeable shunt element of an associated variable-reluctance stator.
Figure 7:
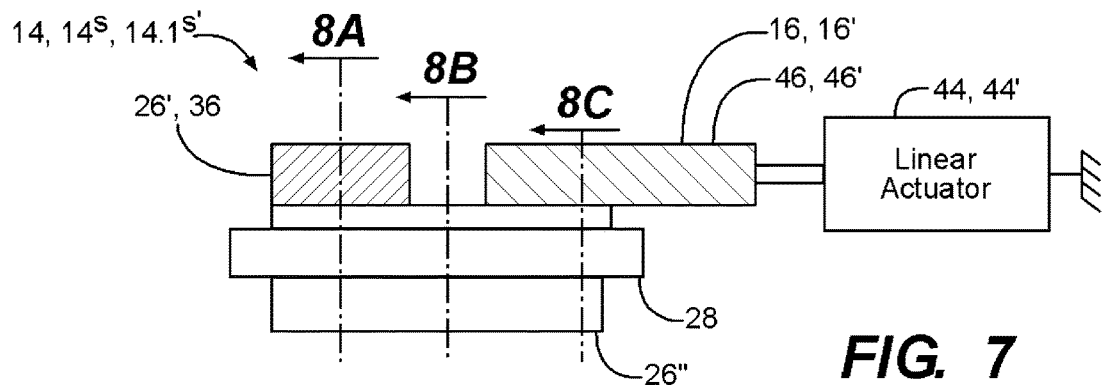
FIG. 7 illustrates a radial-cross-sectional view of a first embodiment of a stator portion of a permanent-magnet generator in accordance with the first class of the first aspect of the variable-reluctance stator.
Figure 8A:
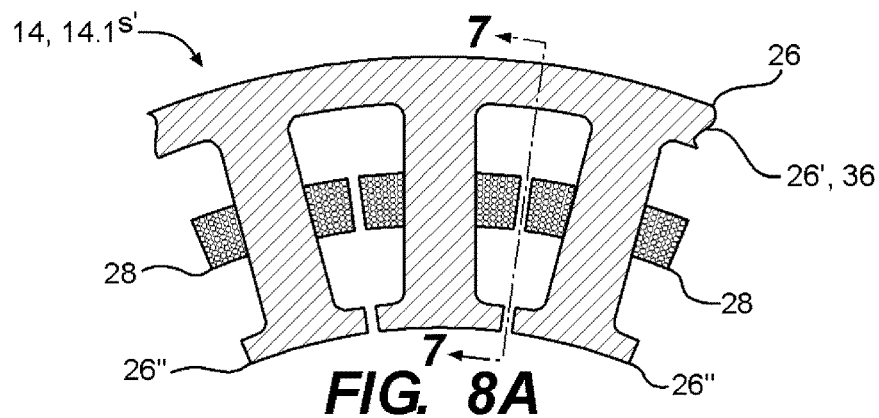
FIG. 8A illustrates a fragmentary axial cross-sectional view through a fixed-reluctance portion of the stator illustrated in FIG. 7, for the first embodiment of the first class, first aspect variable-reluctance stator.
Figure 8B:
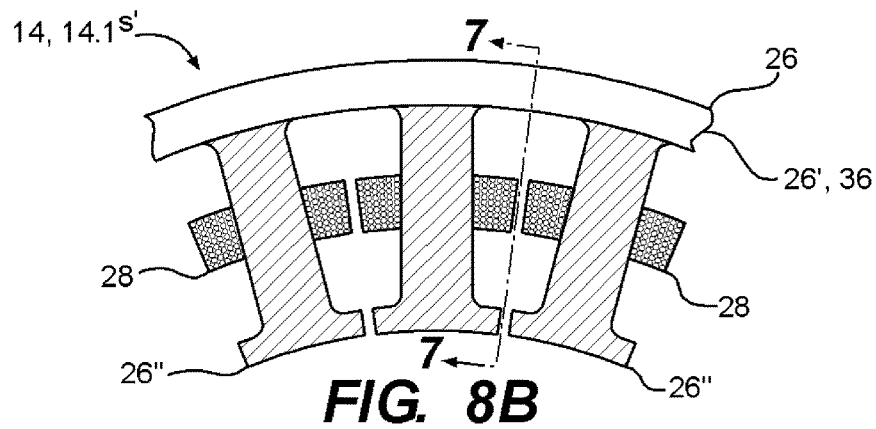
FIG. 8B illustrates a fragmentary axial cross-sectional view through a variable-reluctance portion of the stator illustrated in FIG. 7, in a region from which the associated moveable magnetically-permeable element is retracted or inserted, for the first embodiment of the first class, first aspect variable-reluctance stator.
Figure 8C:
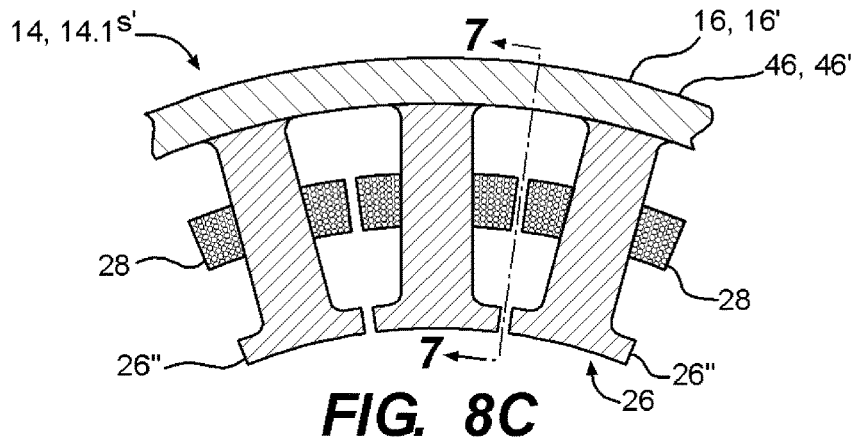
FIG. 8C illustrates a fragmentary axial cross-sectional view through a variable-reluctance portion of the stator portion illustrated in FIG. 7, in a region where the associated moveable magnetically-permeable element is present, for the first embodiment of the first class, first aspect variable-reluctance stator.
Figure 9:
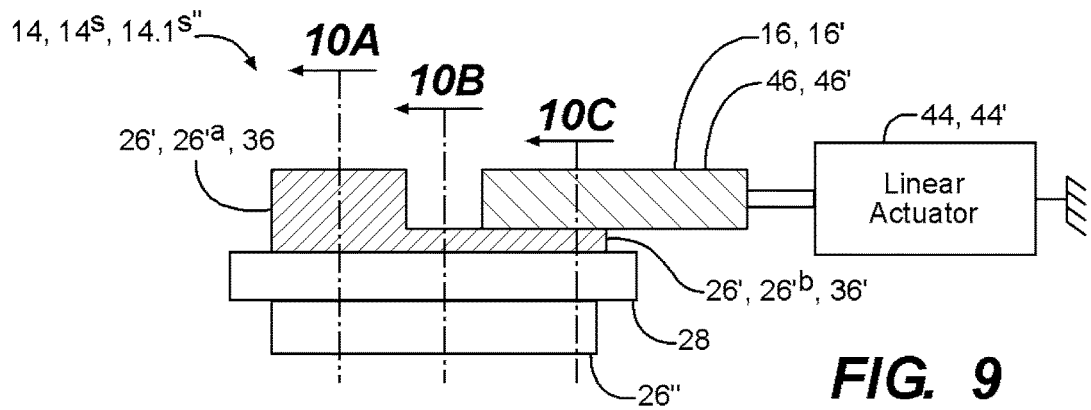
FIG. 9 illustrates a radial-cross-sectional view of a second embodiment of a stator portion of a permanent-magnet generator in accordance with the first class of the first aspect of the variable-reluctance stator.
Figure 10A:
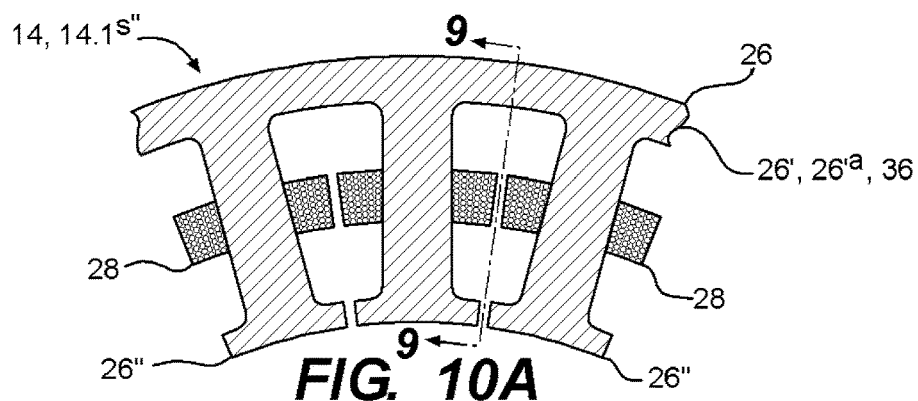
FIG. 10A illustrates a fragmentary axial cross-sectional view through a fixed-reluctance portion of the stator illustrated in FIG. 9, for the second embodiment of the first class, first aspect variable-reluctance stator.
Figure 10B:
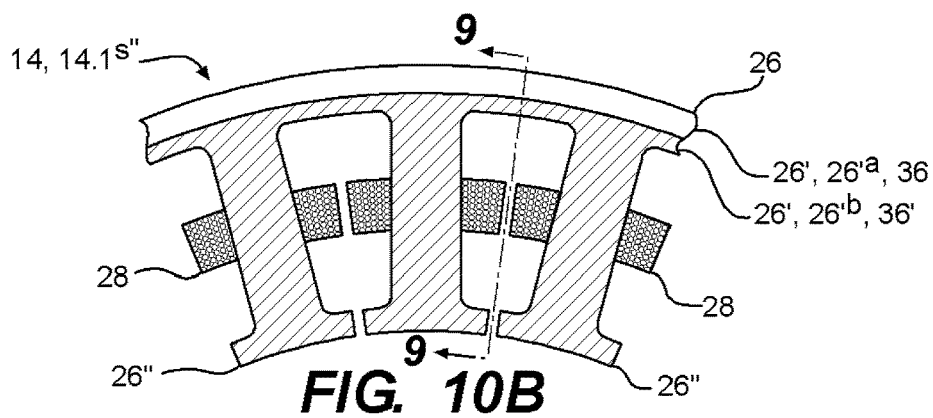
FIG. 10B illustrates a fragmentary axial cross-sectional view through a variable-reluctance portion of the stator illustrated in FIG. 9, in a region from which the associated moveable magnetically-permeable element is retracted or inserted, for the second embodiment of the first class, first aspect variable-reluctance stator.
Figure 10C:
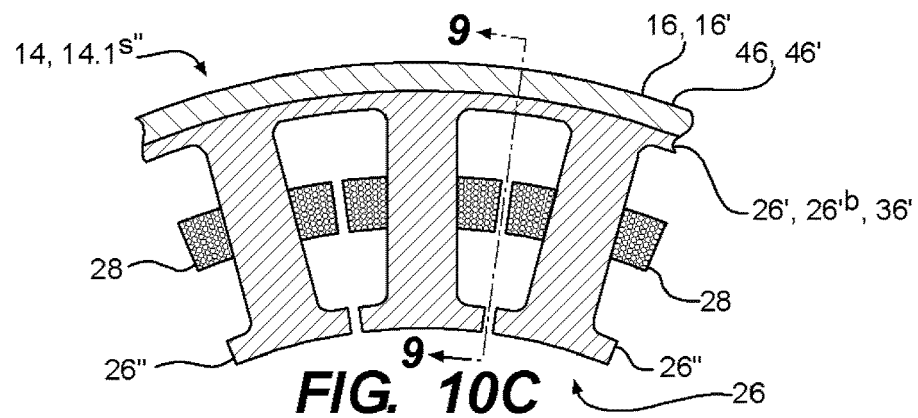
FIG. 10C illustrates a fragmentary axial cross-sectional view through a variable-reluctance portion of the stator portion illustrated in FIG. 9, through both a corresponding fixed-reluctance portion of the stator and a corresponding associated moveable magnetically-permeable element of the variable-reluctance portion of the stator, for the second embodiment of the first class, first aspect variable-reluctance stator.

Referring to FIG. 6B in view of FIGS. 4 and 5, a second aspect of a control system 38.2 that provides for controlling the output voltage of a second aspect 10.2 of a permanent-magnet generator 10, 10.2 incorporating a second aspect variable-reluctance stator 14, 14$^P$—comprising a moveable magnetically-permeable shunt element 16, 16"  in cooperation with an associated laminated stator core 26,—provides for regulating the output voltage v of the associated stator windings/coils 28 by controlling the position of the moveable magnetically-permeable shunt element 16, 16", which in turn controls the magnitude of magnetic flux $\tilde{\Phi}_{Coil}^b$ through a second stator winding/coil 28.2 or second stator winding/coil portion 28.2', or the magnitude of magnetic flux $\tilde{\Phi}_{Coil}$ through the stator winding/coil 28, that is radially-external of, and shunted by, the moveable magnetically-permeable shunt element 16, 16". The total output voltage $V_{Total}$ of a stator winding/coil 28 of a first class, second aspect variable-reluctance stator 14, 14.1$^P$ is given by:

$$v_{Total} = -N \frac{d(\Phi_{Coil} = \Phi_{Total} - \Phi_{Shunt})}{dt}. \quad (6)$$

wherein $\Phi_{Total}$ is the total magnetic flux passing into or out of the stator teeth 26", and $\Phi_{Shunt}$ is the magnetic flux that is shunted between adjacent pairs of the stator teeth 26" without passing through the associated stator winding/coil 28.

For a second class, second aspect variable-reluctance stator 14, 14.2$^P$, the corresponding total peak output voltage $V_{MAX}$ is given by the sum of the respective peak output voltages $V_{MAX1}$, $V_{MAX2}$ of the first 28.1 and second 28.2 stator windings/coils or first 28.1' and second 28.2' stator winding/coil portions, respectively, wherein the peak output voltage $V_{MAX1}$, of the first stator winding/coil 28.1 or first stator winding/coil portion 28.1', with $N_1$ turns, is scaled by the magnitude of total magnetic flux $\Phi_{Total}$ passing through the stator teeth 26", and the peak output voltage $V_{MAX2}$, of the second stator winding/coil 28.2 or second stator winding/coil portion 28.2' having $N_2=N-N_1$ turns, is scaled by the associated magnitude of magnetic flux $\Phi_{Coil}^b$. The total output voltage v is then given by:

$$v_{Total} = -N_1 \frac{d\Phi_{Total}}{dt} - N_2 \frac{d(\Phi_{Coil}^b = \Phi_{Total} - \Phi_{Shunt})}{dt}. \quad (7)$$

With the rotor 12 of the second aspect permanent-magnet generator 10, 10.2 rotating, the total output voltage $V_{Total}$ is responsive to the following: a) the shunt reluctance $\mathcal{R}_{Shunt}$; b) the rotational speed ω of the rotor 12, and c) the load current i in the stator winding/coil 28 that demanded by an associated electrical load 40. Accordingly, an associated variable-reluctance-element position-controller 42 provides for generating a position-control signal u that is input to an associated positioner 44—for example, a linear actuator 44, 44'—operatively coupled to the moveable magnetically-permeable shunt element 16, 16". The positioner 44, 44' provides for moving the moveable magnetically-permeable shunt element 16, 16" relative to the laminated stator core 26 so as to provide for changing the shunt reluctance $\mathcal{R}_{Shunt}$ of the variable-reluctance stator 14 that provides for shunting a portion of the magnetic flux Φ that would otherwise pass through either a stator winding/coil 28 (if of the first class 14.1$^P$), or a second stator winding/coil 28.2 or second stator winding/coil portion 28.2' (if of the second class 14.2$^P$). The position-control signal a is generated by the variable-reluctance-element position-controller 42 responsive to an error signal e, the latter of which is responsive to a difference between a target voltage level $V_{TARGET}$ and the peak total output voltage $V_{MAX}$, so as to provide for regulating the peak total output voltage $V_{MAX}$ to be substantially at the target voltage level $V_{TARGET}$, and to provide for driving the error signal e towards zero, which provides for compensating for the effects of either changes in the rotational speed ω of the rotor 12, or changes in the amount of load current i in, or the temperature of, the stator winding/coil 28 responsive to demand from an associated electrical load 40.

Referring to FIGS. 7 and 8A-C, a first embodiment 14.1$^{S'}$ of the first class 14.1$^S$ of the first aspect 14$^S$ of a variable-reluctance stator 14, 14.1$^{S'}$ incorporates at least a circumferential portion of an annular-ring of magnetically-permeable material 46 as a moveable stator back-iron portion 46' that functions as a moveable magnetically-permeable series element 16, 16' which surrounds and cooperates with the plurality of stator teeth 26" around which the stator windings/coils 28 are wound. The moveable stator back-iron portion 46' is axially moveable in a direction parallel to the rotational axis 22 of the permanent-magnet generator 10 responsive to one or more linear actuators 44, 44' to which the moveable stator back-iron portion 46' is connected. The stator teeth 26" may also cooperate with a fixed stator back-iron portion 26' comprising a circumferentially-extending fixed magnetically-permeable series element 36 that is either continuous or segmented. The series reluctance $\mathcal{R}$ of the variable-reluctance stator 14, 14.1$^{S_1}$ is maximized—to a level governed by the fixed stator back-iron portion 26' if present—when the moveable stator back-iron portion 46' is fully retracted from engagement with the stator teeth 26", and is minimized when the moveable stator back-iron portion 46' is positioned fully over the associated stator teeth 26". The range of control of reluctance $\mathcal{R}$ can be increased by reducing the transverse area of, or eliminating, the circumferentially-extending fixed magnetically-permeable series element 36, however, if eliminated, a non-magnetic structure would otherwise be provided to hold the stator teeth 26" in place.

Referring to FIGS. 9 and 10A-C, a second embodiment 14.1$^{S''}$ of the first class 14.1$^S$ of the first aspect 14$^S$ of a variable-reluctance stator 14, 14.1$^{S''}$ is substantially the same as the above-described first embodiment 14.1$^{S'}$ illustrated in FIGS. 7 and 8A-C, except that a second fixed stator back-iron portion 26'$^b$ comprises a circumferentially-extending fixed magnetically-permeable series element 36' that is either continuous or segmented—but with relatively reduced cross-sectional area relative to that of the circumferentially-extending fixed magnetically-permeable series element 36 of a first fixed stator back-iron portion 26'$^a$ not surrounded by the moveable stator back-iron portion 46'—that cooperates with portions of the stator teeth 26" surrounded by the moveable stator back-iron portion 46'. The relatively-smaller cross-sectional area of the second fixed stator back-iron portion 26'$^b$ has a relatively-higher reluctance $\mathcal{R}$ than the first fixed stator back-iron portion 26'$^a$ so that the moveable stator back-iron portion 46' can provide for a range of series reluctance $\mathcal{R}_s$ of the variable-reluctance stator 14 of the associated magnetic circuit, and thereby provide for controlling a corresponding range of the output voltage v of the associated stator windings/coils 28.

Referring to FIGS. 11-13, an embodiment $14.2^{S'}$ of the second class $14.2^S$ of the first aspect $14^S$ of a variable-reluctance stator 14, $14.2^{S'}$ incorporates a plurality of moveable magnetically-permeable series elements 16, 16' configured as moveable arcuate fingers 48 that are shaped and sized to engage with a corresponding plurality of arcuate slots 50 in the outside of the associated stator back-iron portion 26' of the laminated stator core 26. Each of the moveable arcuate fingers 48 is operatively coupled to one or more linear actuators 44, 44' that provide for controlling the transverse area of the moveable magnetically-permeable series elements 16, 16' in series with the fixed portion of the laminated stator core 26, so as to provide for controlling the series reluctance $\mathcal{R}_s$ of the variable-reluctance stator 14 of the associated magnetic circuit. In one set of embodiments, each of the moveable arcuate fingers 48 optionally incorporate a longitudinal taper 52 that provides for more gradually (relative to a non-tapered moveable arcuate fingers 48) increasing the transverse area of the moveable magnetically-permeable series elements 16, 16' as the moveable arcuate fingers 48 are axially translated into the laminated stator core 26 along the arcuate slots 50 by the one or more linear actuators 44, 44'. In one set of embodiments, the arcuate slots 50 are less than the full depth of the stator back-iron portion 26', so as to provide for a circumferentially-extending fixed magnetically-permeable series element 36 that determines the maximum level of series reluctance $\mathcal{R}_s$ of the variable-reluctance stator 14 of the associated magnetic circuit, wherein the moveable arcuate fingers 48 provide for a range of series reluctance $\mathcal{R}_s$ of the variable-reluctance stator 14 of the associated magnetic circuit, and thereby provide for controlling a corresponding range of the output voltage v of the associated stator windings/coils 28. In one set of embodiments, a moveable arcuate finger 48 and associated arcuate slot 50 is located between every adjacent pair of stator teeth 26". In other embodiments, a moveable arcuate finger 48 and associated arcuate slot 50 may be located between less than every adjacent pair of stator teeth 26". The plurality of moveable arcuate fingers 48 may be configured either to move in unison, to move individually, or to move in groups, each with less than all the moveable arcuate fingers 48.

Figure 16:
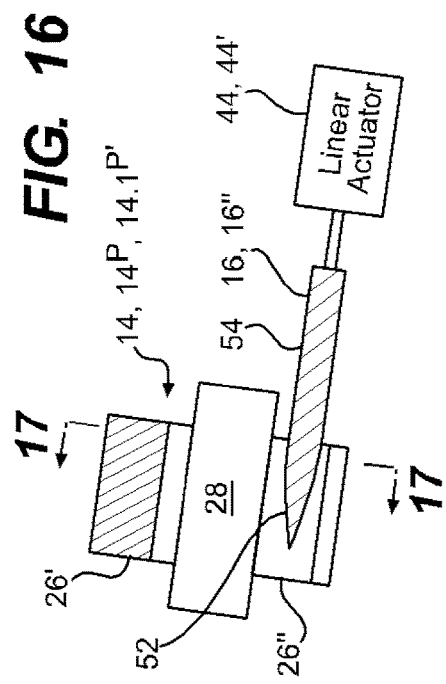
FIG. 16 illustrates a radial cross-sectional view of a variable-reluctance portion of the stator portion of the permanent-magnet generator illustrated in FIGS. 14 and 15, in accordance with the first class, second aspect variable-reluctance stator.
Figure 17:
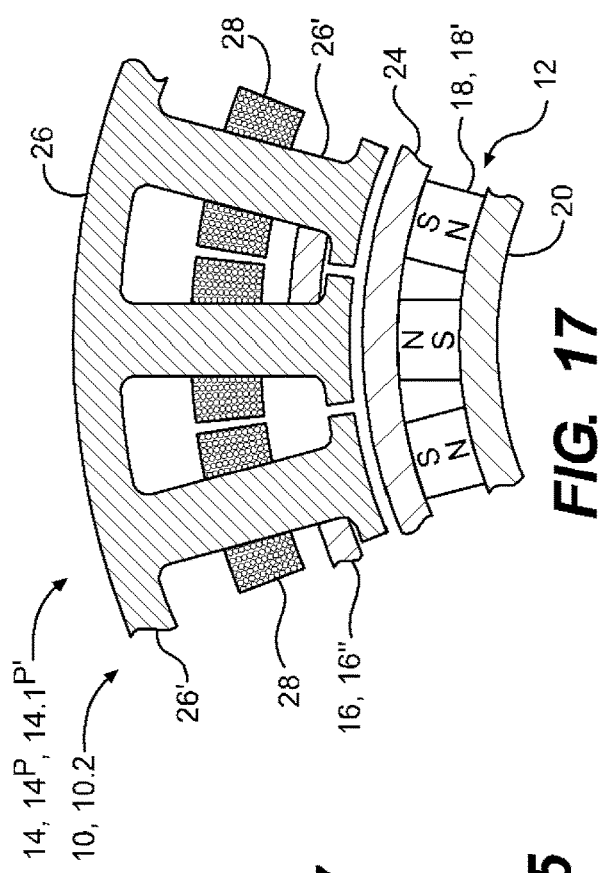
FIG. 17 illustrates a fragmentary axial cross-sectional view through a variable-reluctance portion of the stator portion illustrated in FIGS. 14-16, which includes both a corresponding fixed-reluctance portion of the stator and corresponding associated moveable magnetically-permeable elements of the variable-reluctance portion of the stator, for the first class, second aspect variable-reluctance stator.
Figure 14:
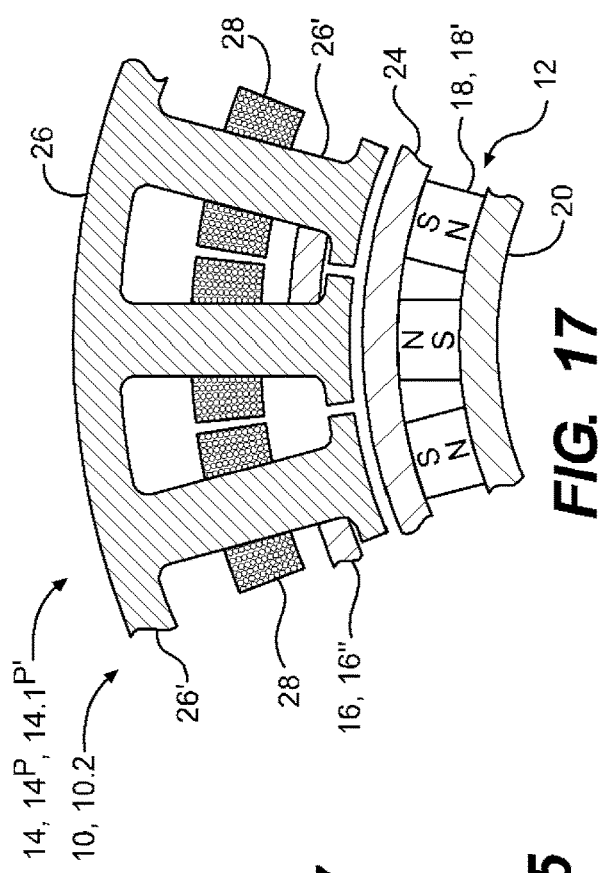
FIG. 14 illustrates a side view of a first embodiment of a stator portion of a permanent-magnet generator in accordance with the first class of the second aspect of the variable-reluctance stator.
Figure 15:
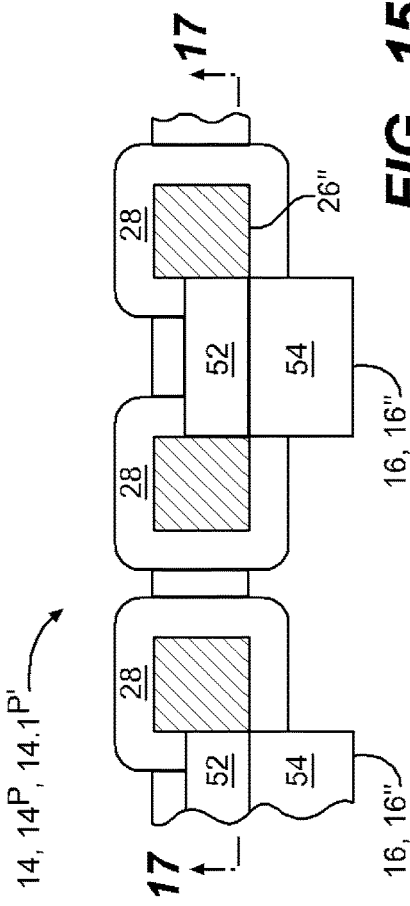
FIG. 15 illustrates a fragmentary, circumferentially-developed, radially-directed cross-sectional view of the first embodiment of the stator portion of the permanent-magnet generator illustrated in FIG. 14, in accordance with the first class, second aspect variable-reluctance stator, viewed toward the outside thereof.

Referring to FIGS. 14-17, a first embodiment $14.1^{P'}$ of the first class $14.1^P$ of the second aspect $14^P$ of a variable-reluctance stator 14, $14.1^{P'}$ incorporates a plurality of moveable magnetically-permeable shunt elements 16, 16" configured as moveable fingers 54—either flat or arcuate—that are shaped and sized to engage with, and between, pairs of stator teeth 26" at a radial location that is radially inboard of the associated stator windings/coils 28. Each of the moveable fingers 54 is operatively coupled to one or more linear actuators 44, 44' that provide for controlling the transverse area of the moveable magnetically-permeable shunt elements 16, 16" that conduct the associated magnetic flux $\Phi_{Shunt}$ shunted between the adjacent stator teeth 26", the latter of which reduces the amount of magnetic flux $\Phi_{Coil}$ that can pass through the associated stator windings/coils 28. In one set of embodiments—for example, as illustrated in FIGS. 14-16—each of the moveable fingers 54 incorporate a longitudinal taper 52 that provides for more gradually (relative to alternative non-tapered moveable fingers 54) increasing the transverse area of the moveable magnetically-permeable shunt elements 16, 16" as the moveable fingers 54 are inserted between pairs of stator teeth 26" by the one or more linear actuators 44, 44'. In one set of embodiments, a moveable finger 54 is located between every other adjacent pair of stator teeth 26". In other embodiments, a moveable finger 54 may be located between either every adjacent pair of stator teeth 26", or less than every other adjacent pair of stator teeth 26". The plurality of moveable fingers 54 may be configured either to move in unison, to move individually, or to move in groups, each with less than all the moveable fingers 54.

Referring to FIGS. 18-21, a first embodiment $14.2^{P'}$ of the second class $14.2^P$ of the second aspect $14^P$ of a variable-reluctance stator 14, $14.2^{P'}$ incorporates a plurality of moveable magnetically-permeable shunt elements 16, 16" configured as moveable fingers 54—either flat or arcuate—that are shaped and sized to engage with, and between, pairs of stator teeth 26" at a radial location that is radially between associated first 28.1 and second 28.2 stator windings/coils, or first 28.1' and second 28.2' stator winding/coil portions, associated with the same stator tooth 26". Each of the moveable fingers 54 is operatively coupled to one or more linear actuators 44, 44' that provide for controlling the transverse area of the moveable magnetically-permeable shunt elements 16, 16" that conduct the associated magnetic flux $\Phi_{Shunt}$ shunted between the adjacent stator teeth 26", the latter of which reduces the amount of magnetic flux $\Phi_{Coil}^b$ that can pass through the associated second stator winding/coil 28.2 or second stator winding/coil portion 28.2'. In one set of embodiments—for example, as illustrated in FIGS. 18-20—each of the moveable fingers 54 incorporate a longitudinal taper 52 that provides for more gradually (relative to alternative non-tapered moveable fingers 54) increasing the transverse area of the moveable magnetically-permeable shunt elements 16, 16" as the moveable fingers 54 are inserted between pairs of stator teeth 26" by the one or more linear actuators 44, 44'. In one set of embodiments, a moveable finger 54 is located between every adjacent pair of stator teeth 26". In other embodiments, a moveable finger 54 may be located between less than every adjacent pair of stator teeth 26". The plurality of moveable fingers 54 may be configured either to move in unison, to move individually, or to move in groups, each with less than all the moveable fingers 54.

Referring to FIGS. 22-26, a second embodiment $14.1^{P''}$ of the first class $14.1^P$ of the second aspect $14^P$ of a variable-reluctance stator 14, $14.1^{P''}$ incorporates a one or more moveable magnetically-permeable shunt elements 16, 16" comprising at least a circumferential portion of an annular-ring portion of magnetically-permeable material 46, 46"—spanning at least two stator teeth 26"—in cooperation with one or more finger portions 54', the latter of which function the same as the moveable fingers 54 of the above-described first embodiment $14.1^P$ of the first class, second aspect variable-reluctance stator 14, $14.1^{P'}$ illustrated in FIGS. 14-17. With the moveable magnetically-permeable shunt element(s) 16, 16", 46", 54' partially deployed towards the laminated stator core 26 by the linear actuator(s) 44, 44', as illustrated in FIGS. 23 and 24, the associated shunt reluctance $\mathcal{R}_{Shunt}$ is primarily responsive to the action of the finger portion(s) 54' of the moveable magnetically-permeable shunt element(s) 16, 16", 46", 54'. However, as the annular-ring portion of magnetically-permeable material 46, 46" becomes closer to, and eventually bottoms out against the stator teeth 26"—so as to be in abutment therewith—respectively near and at the end of travel of the linear actuator(s) 44, 44', the latter as illustrated in FIGS. 25 and 26, the annular-ring portion of magnetically-permeable material 46, 46" provides an additional path for the magnetic flux $\Phi_{Shunt}$ between the stator teeth 26", thereby further reducing the associated shunt reluctance $\mathcal{R}_{Shunt}$ therebetween.

Referring to FIGS. 27-31, a third embodiment $14.1^{P'''}$ of the first class $14.1^P$ of the second aspect $14^P$ of a variable-reluctance stator 14, $14.1^{P'''}$ incorporates one or more moveable magnetically-permeable shunt elements 16, 16" comprising at least a circumferential portion of an annular-ring of magnetically-permeable material 46, 46'''—spanning at least two stator teeth 26", similar to the second embodiment $14.1^{P''}$ of the first class, second aspect $14^P$ variable-reluctance stator 14, $14.1^{P''}$ illustrated in FIGS. 22-26, but without the associated finger portion(s) 54'. The associated magnetic flux $\Phi_{Shunt}$ between stator teeth 26" spanned by the annular-ring of magnetically-permeable material 46, 46''' is responsive to the proximity thereof to the laminated stator core 26. With the annular-ring of magnetically-permeable material 46, 46''' displaced from the laminated stator core 26, for example, as illustrated in FIGS. 28 and 29, the associated shunt reluctance $\mathcal{R}_{Shunt}$ between the stator teeth 26" spanned by the annular-ring of magnetically-permeable material 46, 46''' is relatively high, but as the annular-ring of magnetically-permeable material 46, 46''' becomes closer to, and eventually bottoms out against the stator teeth 26"—so as to be in abutment therewith—respectively near and at the end of travel of the linear actuator(s) 44, 44', the latter as illustrated in FIGS. 30 and 31, the annular-ring of magnetically-permeable material 46, 46''' provides a path for the magnetic flux $\Phi_{Shunt}$ between the stator teeth 26", thereby reducing the associated shunt reluctance $\mathcal{R}_{Shunt}$ therebetween.

Referring to FIGS. 32-36, a second embodiment $14.2^{P''}$ of the second class $14.2^P$ of the second aspect $14^P$ of a variable-reluctance stator 14, $14.2^{P''}$ incorporates one or more moveable magnetically-permeable shunt elements 16, 16" comprising at least a circumferential portion of an annular-ring portion of magnetically-permeable material 46, 46"—spanning at least two stator teeth 26"—in cooperation with one or more finger portions 54', the latter of which function the same as the moveable fingers 54 of the above-described first embodiment $14.2^{P'}$ of the second class, second aspect variable-reluctance stator 14, $14.2^{P'}$ illustrated in FIGS. 18-21. With the moveable magnetically-permeable shunt element(s) 16, 16", 46", 54' partially deployed towards the laminated stator core 26 by the linear actuator(s) 44, 44', as illustrated in FIGS. 33 and 34, the associated shunt reluctance $\mathcal{R}_{Shunt}$ is primarily responsive to the action of the finger portion(s) 54' of the moveable magnetically-permeable shunt element(s) 16, 16", 46", 54'. However, as the annular-ring portion of magnetically-permeable material 46, 46" becomes closer to, and eventually bottoms out against the stator teeth 26"—so as to be in abutment therewith—respectively near and at the end of travel of the linear actuator(s) 44, 44', the latter as illustrated in FIGS. 35 and 36, the annular-ring portion of magnetically-permeable material 46, 46" provides an additional path for the magnetic flux $\Phi_{Shunt}$ between the stator teeth 26", thereby further reducing the associated shunt reluctance $\mathcal{R}_{Shunt}$ therebetween.

Referring to FIGS. 37-41, a third embodiment $14.2^{P'''}$ of the second class $14.2^P$ of the second aspect $14^P$ of a variable-reluctance stator 14, $14.2^{P'''}$ incorporates one or more moveable magnetically-permeable shunt elements 16, 16" comprising at least a circumferential portion of an annular-ring of magnetically-permeable material 46, 46'''—spanning at least two stator teeth 26", similar to the second embodiment $14.2^{P''}$ of the second class, second aspect $14^P$ variable-reluctance stator 14, $14.2^{P''}$, but without the associated finger portion(s) 54'. The associated magnetic flux $\Phi_{Shunt}$ between stator teeth 26" spanned by the annular-ring of magnetically-permeable material 46, 46''' is responsive to the proximity thereof to the laminated stator core 26. With the annular-ring of magnetically-permeable material 46, 46''' displaced from the laminated stator core 26, for example, as illustrated in FIGS. 38 and 39, the associated shunt reluctance $\mathcal{R}_{Shunt}$ between the stator teeth 26" spanned by the annular-ring of magnetically-permeable material 46, 46''' is relatively high, but as the annular-ring of magnetically-permeable material 46, 46''' becomes closer to, and eventually bottoms out against the stator teeth 26"—so as to be in abutment therewith—respectively near and at the end of travel of the linear actuator(s) 44, 44', the latter as illustrated in FIGS. 40 and 41, the annular-ring of magnetically-permeable material 46, 46''' provides a path for the magnetic flux $\Phi_{Shunt}$ between the stator teeth 26", thereby reducing the associated shunt reluctance $\mathcal{R}_{Shunt}$ therebetween.

The effectiveness of the above described second $14.1^{P''}$ and third $14.1^{P'''}$ embodiments of the first aspect, variable-reluctance stator 14, $14.1^{P''}$, $14.1^{P'''}$ illustrated in FIGS. 22-26 and FIGS. 27-31, respectively, and the second $14.2^{P''}$ and third $14.2^{P'''}$ embodiments of the second aspect, variable-reluctance stator 14, $14.2^{P''}$, $14.2^{P'''}$ illustrated in FIGS. 32-36 and FIGS. 37-41, respectively, in respect of the action of the associated annular-ring portion of magnetically-permeable material 46, 46" or annular-ring of magnetically-permeable material 46, 46''' would be expected to be greater for a laminated stator core 26 for which the ratio of outside diameter to axial thickness is relatively larger than for laminated stator core 26 for which the ratio of outside diameter to axial thickness is relatively smaller.

With reference to the aspects and embodiments illustrated in FIGS. 7-10C and 22-41, In accordance with one set of embodiments, the annular-ring or annular-ring-portion of magnetically-permeable material 46, 46', 46", 46''' is circumferentially continuous. Alternatively, the annular-ring or annular-ring-portion of magnetically-permeable material 46, 46', 46", 46''' may be circumferentially segmented to provide for a plurality of independently controllable annular-ring segments. If circumferentially segmented, the plurality of circumferential segments may be configured either to move in unison, to move individually, or to move in groups, each with less than all the circumferential segments. The annular-ring or annular-ring-portion of magnetically-permeable material 46, 46', 46", 46''' may be constructed of either a solid magnetically-permeable material, or a laminated structure of magnetically-permeable material, for example, 3% Silicon steel, with the lamination planes oriented parallel to the direction of the associated magnetic flux $\Phi$.

Figure 42:
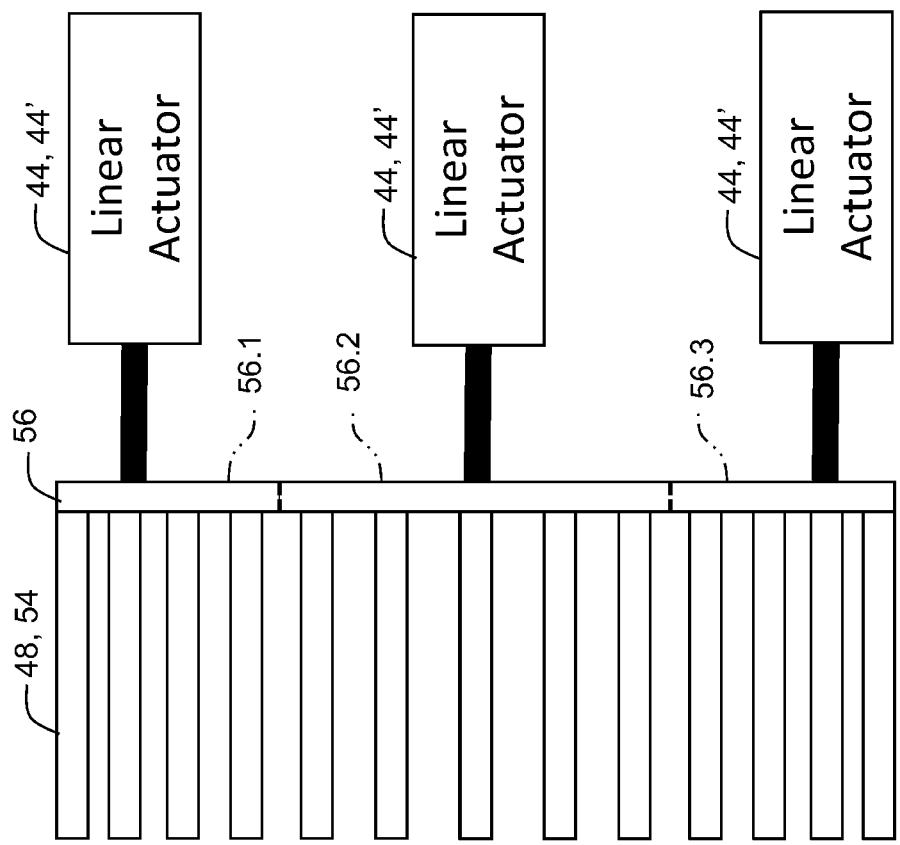
FIG. 42 illustrates a side view of system for actuating a set of moveable magnetically-permeable elements of a variable-reluctance stator of a permanent-magnet generator.
Figure 43:
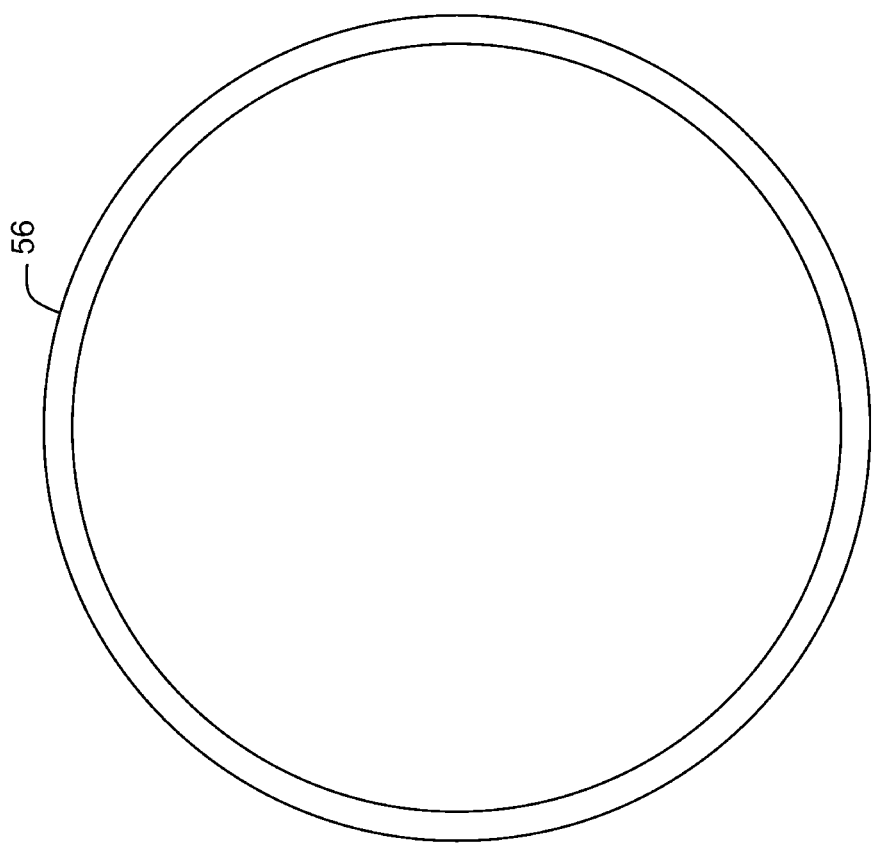
FIG. 43 illustrates a plan view of a ring that couples the plurality of moveable magnetically-permeable elements illustrated in FIG. 42.

Referring to FIGS. 42 and 43, in accordance with one set of embodiments, the plurality of moveable fingers 48, 54 are operatively coupled to a ring 56 that is in turn operatively coupled to a plurality of linear actuators 44, 44' that collectively provide for translating the ring 56 and moveable fingers 48, 54 relative to the laminated stator core 26 while maintaining the axial alignment of the moveable fingers 48, 54 with the laminated stator core 26. Alternatively, the moveable fingers 48, 54 could be actuated individually, each with a corresponding associated linear actuator 44, 44'. Furthermore, different subsets of moveable fingers 48, 54 could be operatively coupled to different rings 56 or ring segments 56.1, 56.2, 56.3, each of which different rings 56 or ring segments 56.1, 56.2 is separately actuated to provide for positioning the associated subset of moveable fingers 48, 54 attached thereto in unison. The linear actuators 44, 44' may be configured to provide for either continuous positioning, or discrete positioning, for example, binary positioning, i.e. in or out. For example, a binary positioning system incorporating N linear actuator 44, 44' could provide for $2^N$ distinct combinations of reluctance. For example, the linear actuator 44' could be implemented with a linear motor; a motor-driven screw, cam or linkage; a linear solenoid; or a pneumatic or hydraulic actuator.

Depending upon the range of voltage variation to be compensated, some or all of the prospective locations of variable-reluctance elements 16, 16', 16" could incorporate moveable fingers 48, 54, and some could be fixed but tunable, for example, by having a manually adjustable axial position. The associated control authority to be provided for by the variable-reluctance stator 14 is dependent upon the range of voltage variation to be compensated. If the effects of rotational speed, load and temperature ranges on output voltage is relatively small compared to the nominal output voltage of the permanent-magnet generator 10, 10.1, 10.2 then the associated authority of the variable-reluctance stator 14 can also be relatively small. Rotational speed range is the largest influencing factor, followed by load range and then temperature range. For gas-turbine engine applications, the associated operating rotational speed range can vary considerably from one application to the next. In some applications rotational speed is held near constant while torque is varied. In others, rotational speed may vary over as much as a 2 to 1 range. A particular variable-reluctance stator 14 need only accommodate the associated applications range. A smaller range of authority would likely result in a lower cost implementation. The range of variation of flux path reluctance $\mathcal{R}$ is responsive to the positions of the variable-reluctance elements 16, 16', 16" relative to the laminated stator core 26. In one set of embodiments, the range of variation of flux path reluctance $\mathcal{R}$ necessary to compensate for the effects of rotational speed, load and temperature on output voltage may be achievable without saturation ever occurring in the laminated stator core 26, particularly the stator back-iron portion 26', 26'$^a$, 26'$^b$, at a condition of maximum reluctance $\mathcal{R}$. Alternatively, in some embodiments associated with moveable magnetically-permeable series elements 16, 16', for maximum authority, some amount of saturation in the laminated stator core 26, particularly the stator back-iron portion 26', 26'$^a$, 26'$^b$, may occur during conditions of maximum reluctance $\mathcal{R}$, resulting in a nonlinearity that would be accommodated by the associated control system 38.1.

Generally, radial locations of the moveable fingers 48, 54 that are closest to the rotor 12 will have greater authority than locations that are further from the rotor 12 as a result of the nature of magnetic flux $\Phi$ distribution within the associated magnetic circuit.

The variable-reluctance stator 14 may incorporate one or more relatively low-friction slides, shims, or coatings; or lubricant, between the moveable fingers 48, 54 and laminated stator core 26 in order to overcome friction resulting from a magnetic attraction therebetween during operation of the permanent-magnet generator 10, 10.1, 10.2, with the associated positioner(s) 44 or linear actuator(s) 44, 44' provided with sufficient authority to accommodate the associated friction. The moveable stator back-iron portion 46' or moveable fingers 48, 54 are sufficiently thick to carry the associated magnetic flux $\Phi$ therethrough, either in a series element of the core loop that is surrounded by the stator windings/coils 28, or shunted between adjacent stator teeth 26". As a result, moveable fingers 48, 54 relatively closer to the rotor 12 would typically be thicker than those relatively farther therefrom, resulting in a relatively larger laminated stator core 26 to accommodate both the stator windings/coils 28, 28.1, 28.1', 28.2, 28.2' and the moveable fingers 48, 54.

Alternatively, the variable-reluctance stator 14 may be adapted with a greater number (e.g. at a greater number of locations) of relatively thinner moveable fingers 48, 54 if the overall size of the laminated stator core 26 is a controlling factor.

Figure 44:
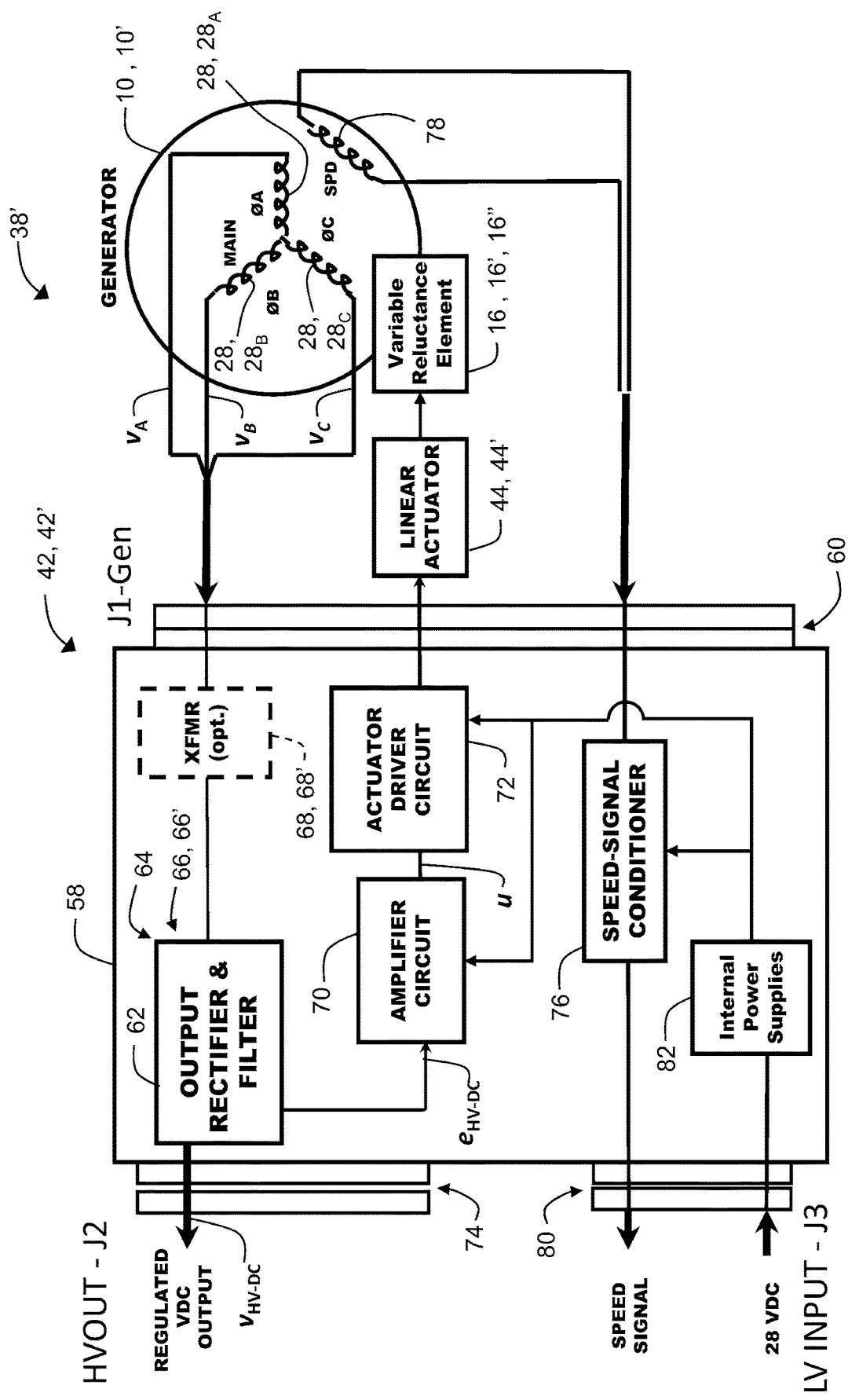
FIG. 44 illustrates a block diagram of a variable-reluctance-element position-control system for controlling the output voltage of a permanent-magnet generator by linear actuation of a moveable magnetically-permeable element of a variable-reluctance stator of the permanent-magnet generator.

Referring to FIG. 44, a power converter and controller 58 of an associated control system 38' incorporates an embodiment of a variable-reluctance-element position-controller 42, 42' that provides for controlling one or more variable-reluctance element 16, 16', 16" of a three-phase permanent-magnet generator 10, 10' so as to provide for regulating the output voltage v of the associated stator windings/coils 28 responsive to variations of rotational speed, load current, or operating temperature—and associated time constants—during operation of the permanent-magnet generator 10, 10', or responsive to variations—relative to nominal—of the electrical or magnetic properties of the particular associated components of the three-phase permanent-magnet generator 10, 10', for example, as a result of manufacturing tolerances or inherent material property variation. More particularly, the three-phase permanent-magnet generator 10, 10' incorporates three sets of stator windings/coils 28, $28_A$, $28_B$, $28_C$,—each associated with a separate phase $\phi_A$, $\phi_B$, $\phi_C$,—for example, that are circumferentially and uniformly interleaved with respect to one another, and, in one set of embodiments, cooperate with permanent magnets 18 of the rotors 12 that each have a circumferential span that is the same as three stator teeth 26"—rather than only one as illustrated in the above embodiments—so as to provide for three-phase operation, although the relation between the circumferential spans of the permanent magnets 18 and the stator teeth 26" is not limiting, and other configurations are possible as would be known by one of ordinary skill in the art.

More particularly, the output voltage signals $v_A$, $v_B$, $v_C$ associated with each of the phases $\phi_A$, $\phi_B$, $\phi_C$, operatively coupled via an associated generator connector 60 (labeled "J1-GEN") to an output rectifier and filter 62 of the power converter and controller 58 that provides for generating a relatively high-voltage regulated DC output voltage signal $v_{HV-DC}$. For example, in one set of embodiments, the output rectifier and filter 62 comprises a three-phase rectifier 64 followed by an output filter 66, for example, a low-pass filter 66'. The output filter 66 is provided to reduce any repeating perturbations of the output voltage and the amount of filtering is determined by the users need for the amount of deviation from the regulation point that can be tolerated. Usually the largest repeating perturbation in voltage is the result of the ripple that comes from the rectification process. The ripple frequency for a full wave rectification process would be equal to two times the number of phases times the fundamental frequency of the generator. The second largest repeating perturbation in voltage is a result of the rectifier switching noise. Output filters are selected to attenuate the levels of the perturbations and can have any number of poles and cutoff frequencies determined by the amount of attenuation needed to comply with the particular regulation requirements, in accordance with standard design practice to configure the structure and cutoff frequency of the output filter 66 to provide for reducing the output ripple and rectifier noise to an acceptable level. For example, in one set of embodiments, the output filter 66 comprises a a single pole low-pass filter 66' having a cutoff frequency below the lowest expected operating ripple frequency.

Although the variable-reluctance-element position-controller 42, 42' and variable-reluctance element 16, 16', 16" of the three-phase permanent-magnet generator 10, 10' provide for regulating the peak-to-peak magnitude of the output voltage signals $v_A$, $v_B$, $v_C$, which implicitly determines the magnitude of the resulting DC output voltage signal $v_{HV\text{-}DC}$, the power converter and controller 58 may optionally incorporate a transformer 68, for example, a three-phase transformer 68, 68', that provides for transforming the magnitude of the regulated output voltage signals $v_A$, $v_B$, $v_C$ from the three-phase permanent-magnet generator 10, 10' to a more suitable magnitude that provides for the magnitude of resulting DC output voltage signal $v_{HV\text{-}DC}$ to differ from what otherwise would be provided for by the output voltage signals $v_A$, $v_B$, $v_C$ without such transformation. The difference between the magnitude of the DC output voltage signal $v_{HV\text{-}DC}$ from the output rectifier and filter 62 and an associated target voltage level $V_{TARGET}$, i.e. a resulting error signal $e_{HV\text{-}DC}$, is fed into an amplifier circuit 70 that generates a position-control signal u that is fed into an associated actuator driver circuit 72, the latter of which provides for driving an associated linear actuator 44, 44' that provides for positioning an associate one or more variable-reluctance elements 16, 16', 16" that, in cooperation with the laminated stator core 26 of the three-phase permanent-magnet generator 10, 10', provides for regulating the output voltage signals $v_A$, $v_B$, $v_C$ from the stator windings/coils 28, $28_A$, $28_B$, $28_C$ in order to null the resulting error signal $e_{HV\text{-}DC}$. In one set of embodiments, the combination of the amplifier circuit 70 and actuator driver circuit 72 provide for feedback proportional control. Alternatively, the amplifier circuit 70 and actuator driver circuit 72 may also provide for phase compensation, for example, one or more of feedback integral control, feedback differential control or feed-forward control. The control of voltage magnitude by controlling the reluctance $\mathcal{R}$ of a variable-reluctance stator 14 provides for the relatively simpler architecture of the above-described power converter and controller 58 than might otherwise be used—for example, a DC-DC converter together with an associated initial stage of rectification and filtering—to regulate the magnitude of the DC output voltage signal $v_{HV\text{-}DC}$ absent a controllable variable-reluctance stator 14. In one set of embodiments, the regulated DC output voltage signal $v_{HV\text{-}DC}$ is operatively coupled from the power converter and controller 58 to the end use—for example, an associated vehicle—via an associated high-voltage output connector 74 (labeled "HVOUT-J2"). The power converter and controller 58 further incorporates a speed-signal conditioner 76 for conditioning a speed signal from an associated speed winding 78 of the three-phase permanent-magnet generator 10, 10', and outputting the conditioned speed signal via an associated low-voltage connector 80 (labeled "LV INPUT-J3"). The speed-signal conditioner 76, amplifier circuit 70, and actuator driver circuit 72 of the power converter and controller 58 are powered from one or more internal power supplies 82 powered from a relatively low-voltage, external DC source, e.g. 28 volts, that is input to the power converter and controller 58 via the low-voltage connector 80.

Although the above-described voltage control system would be expected to provide for robust control of output voltage responsive to variations in rotational speed, load current, operating temperature, and time constants associated therewith, or responsive to variations in electrical or magnetic properties as a result of manufacturing tolerances or inherent material property variation, alternatively, a control system could provide for controlling the variable-reluctance stator 14 responsive to the principal factor or factors affecting the magnitude of the generated voltage, i.e. rotational speed, possibly also load current, or possibly also operating temperature.

Alternatively, the rotor 12 could magnetically shunted in a manner similar the above-described manner in which the variable-reluctance stator 14 is magnetically shunted, for example, using similar moveable magnetically-permeable shunt elements 16" in proximity the faces of the permanent magnets 18, 18'.

The magnetic permeability $\mu$ of a material is given by the product $\mu_0 \cdot \mu_r$, wherein $\mu_0$ is the magnetic permeability of vacuum—which is $1.257 \cdot 10^{-6}$ Henries per meter,—and is $\mu_r$ referred to a relative permeability. Non-magnetic materials—for example, aluminum, Inconel® 718, titanium and 300 series stainless steels—have a value of relative permeability $\mu_r$ close to unity. As used herein, a non-magnetic material is defined to be a material with a relative permeability having a value less than 1.5.

Materials having a relatively-high value of magnetic permeability usually contain iron—for example, soft iron such as either 1018 steel or 1020 steel in the annealed state, which can have a relative permeability having a value in excess of 1000,—and sometimes contain special alloys. Magnetic permeability can vary considerably due to the operating point or the applied magnetic force. Although magnetic permeability decreases at higher magnetizing forces, the material can generally still be used provided that saturation does not occur. As used herein, a magnetically-permeable material is defined to have a value of relative permeability $\mu_r$ greater than 1000, examples of which include, but are not limited to, 3% Silicon steel for the laminations, 1018 steel, 4340 steel with a special heat treat to obtain high permeability, and some high strength. 400 series steels.

It should be understood that references to a coil in series with a magnetic circuit is intended to mean that that coil is flux-linked to the associated magnetic circuit, notwithstanding that the coil physically encircles the magnetic circuit.

Furthermore, it should also be understood that the variable-reluctance elements 16, 16', 16" referred to herein are moveable magnetically-permeable elements that may cooperate with other elements in a corresponding segment of an associated magnetic circuit, the reluctance of which segment is given by the combination of the effects of each of the elements—variable and fixed—in that corresponding segment. For example, the reluctance of the above-described moveable arcuate fingers 48 or moveable fingers 54 or finger portions 54' will be given by the sum of the effects of the those elements with the reluctance of any associate air gaps in series therewith, and—for example, for the embodiment illustrated in FIGS. 11-13—may be in parallel with a reluctance of an associated stator back-iron portion 26' if in parallel therewith. For example, the moveable arcuate fingers 48 or moveable fingers 54 or finger portions 54' may also be tapered or stepped in plan view, i.e. laterally tapered or stepped, which would provide the series reluctance component of the associated air gap(s) to vary with axial position.

Similarly, the reluctance of a segment of the magnetic circuit associated with the annular-ring of magnetically-permeable material 46 or moveable stator back-iron portion 46' for the embodiments illustrated in FIGS. 7-10C would include reluctance contributions from the annular-ring of magnetically-permeable material 46 or moveable stator back-iron portion 46', and—if present, combined in parallel—an associated stator back-iron portion 26'.

It should be understood that the above-described and illustrated configurations of a) the fixed portions of the variable-reluctance stator 14 and associated laminated stator core 26, b) the rotor 12 and associated permanent magnets 18, 18' and non-magnetic magnet-retaining ring 24, and c) the stator windings/coils 28 are not limiting. For example, these features of the permanent magnet generator 10 could be implemented in accordance with the disclosure of U.S. patent application Ser. No. 16/367,110 filed on 27 Mar. 2019, entitled RADIAL-FLUX SHROUDED-FAN GENERATOR, which is incorporated herein by reference in its entirety.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A variable-reluctance stator system for use with a radial-flux rotor of a permanent-magnet generator, comprising:
   a. a plurality of radially-oriented stator teeth uniformly circumferentially distributed around a central axis, wherein each radially-inboard edge of each stator tooth of said plurality of radially-oriented stator teeth is outside a cylindrical boundary centered about said central axis and configured to receive the radial-flux rotor; and
   b. at least one moveable magnetically-permeable element in magnetic communication with at least one pair of adjacent stator teeth of said plurality of radially-oriented stator teeth, wherein said at least one moveable magnetically-permeable element is axially positionable relative to said plurality of radially-oriented stator teeth along an associated positioning axis substantially parallel to said central axis, so as to provide for linking magnetic flux between said at least one pair of adjacent stator teeth of said plurality of radially-oriented stator teeth and with an associated at least one conductive coil-or-winding associated with said at least one pair of adjacent stator teeth via said at least one moveable magnetically-permeable element, series magnetic reluctance of said at least one pair of adjacent stator teeth in series magnetically with said at least one moveable magnetically-permeable element is responsive to an axial position of said at least one moveable magnetically-permeable element relative to said at least one pair of adjacent stator teeth, and a magnitude of said magnetic flux linked with said at least one conductive coil-or-winding is inversely related to a magnitude of said series magnetic reluctance.

2. A variable-reluctance stator system for use with a radial-flux rotor of a permanent-magnet generator as recited in claim 1, further comprising:
   a. said at least one conductive coil-or-winding around and flux-linked to at least one stator tooth of said at least one pair of adjacent stator teeth; and
   b. the radial-flux rotor having an axis of rotation that is collinear with said central axis, wherein said radial-flux rotor comprises:
      i. an annular magnetically-permeable rotor yoke concentric with said axis of rotation;
      ii. an even-numbered plurality of permanent magnets operatively coupled to an outer surface of said annular magnetically-permeable rotor yoke, wherein said plurality of permanent magnets are oriented so that each North-South axis of each permanent magnet of said plurality of permanent magnets is substantially radially oriented with respect to said axis of rotation, and the North-South orientations of every pair of circumferentially-adjacent permanent magnets of said plurality of permanent magnets are opposite to one another; and
      iii. a first retaining ring encircling said plurality of permanent magnets, wherein said first retaining ring is non-magnetic, and said first retaining ring has sufficient hoop strength to retain said plurality of permanent magnets on said annular magnetically-permeable rotor yoke in reaction to centrifugal forces acting on said plurality of permanent magnets during operation of said radial-flux rotor.

3. A variable-reluctance stator system for use with a radial-flux rotor of a permanent-magnet generator as recited in claim 2, further comprising at least one linear actuator operatively coupled to a corresponding said at least one moveable magnetically-permeable element that provides for positioning said corresponding said at least one moveable magnetically-permeable element along a corresponding said associated positioning axis.

4. A variable-reluctance stator system for use with a radial-flux rotor of a permanent-magnet generator as recited in claim 1, wherein each of said plurality of radially-oriented stator teeth are constructed of a plurality of laminations of a magnetically-permeable material.

5. A variable-reluctance stator system for use with a radial-flux rotor of a permanent-magnet generator comprising:
   a. a plurality of radially-oriented stator teeth uniformly circumferentially distributed around a central axis, wherein each radially-inboard edge of each stator tooth of said plurality of radially-oriented stator teeth is outside a cylindrical boundary centered about said central axis and configured to receive the radial-flux rotor; and b. at least one moveable magnetically-permeable element in magnetic communication with at least one pair of adjacent stator teeth of said plurality of radially-oriented stator teeth, wherein said at least one moveable magnetically-permeable element is axially positionable relative to said plurality of radially-oriented stator teeth along an associated positioning axis substantially parallel to said central axis, so as to provide for linking magnetic flux between said at least one pair of adjacent stator teeth of said plurality of radially-oriented stator teeth via said at least one moveable magnetically-permeable element, and a series magnetic reluctance of said at least one pair of adjacent stator teeth in series magnetically with said at least one moveable magnetically-permeable element is responsive to an axial position of said at least one moveable magnetically-permeable element relative to said at least one pair of adjacent stator teeth;

further comprising at least one fixed magnetically-permeable element extending between, or integral with, said at least one pair of adjacent stator teeth at a radial location that is radially external of a location of a corresponding associated at least one conductive coil-or-winding associated with said at least one pair of adjacent stator teeth.

6. A variable-reluctance stator system for use with a radial-flux rotor of a permanent-magnet generator as recited in claim 5, wherein said at least one fixed magnetically-permeable element is magnetically continuous around, and integral with, said plurality of radially-oriented stator teeth.

7. A variable-reluctance stator system for use with a radial-flux rotor of a permanent-magnet generator comprising:

a. a plurality of radially-oriented stator teeth uniformly circumferentially distributed around a central axis, wherein each radially-inboard edge of each stator tooth of said plurality of radially-oriented stator teeth is outside a cylindrical boundary centered about said central axis and configured to receive the radial-flux rotor; and b. at least one moveable magnetically-permeable element in magnetic communication with at least one pair of adjacent stator teeth of said plurality of radially-oriented stator teeth, wherein said at least one moveable magnetically-permeable element is axially positionable relative to said plurality of radially-oriented stator teeth along an associated positioning axis substantially parallel to said central axis, so as to provide for linking magnetic flux between said at least one pair of adjacent stator teeth of said plurality of radially-oriented stator teeth via said at least one moveable magnetically-permeable element, and a series magnetic reluctance of said at least one pair of adjacent stator teeth in series magnetically with said at least one moveable magnetically-permeable element is responsive to an axial position of said at least one moveable magnetically-permeable element relative to said at least one pair of adjacent stator teeth wherein said at least one moveable magnetically-permeable element is in series magnetically with said at least one pair of adjacent stator teeth at a radial location that is radially external of a location of a corresponding associated at least one conductive coil-or-winding associated with said at least one pair of adjacent stator teeth.

8. A variable-reluctance stator system for use with a radial-flux rotor of a permanent-magnet generator as recited in claim 7, wherein said at least one moveable magnetically-permeable element is located radially outboard of said at least one pair of adjacent stator teeth when fully engaged therewith.

9. A variable-reluctance stator system for use with a radial-flux rotor of a permanent-magnet generator as recited in claim 8, further comprising at least one fixed magnetically-permeable element extending between, or integral with, said at least one pair of adjacent stator teeth, wherein said at least one moveable magnetically-permeable element is located radially outboard of, and concentric with, at least a portion of a fixed stator back-iron portion that is integral with said at least one pair of adjacent stator teeth, when fully engaged therewith.

10. A variable-reluctance stator system for use with a radial-flux rotor of a permanent-magnet generator as recited in claim 7, wherein said at least one moveable magnetically-permeable element is located circumferentially between said at least one pair of adjacent stator teeth when fully engaged therewith.

11. A variable-reluctance stator system for use with a radial-flux rotor of a permanent-magnet generator comprising:

a. a plurality of radially-oriented stator teeth uniformly circumferentially distributed around a central axis, wherein each radially-inboard edge of each stator tooth of said plurality of radially-oriented stator teeth is outside a cylindrical boundary centered about said central axis and configured to receive the radial-flux rotor; and b. at least one moveable magnetically-permeable element in magnetic communication with at least one pair of adjacent stator teeth of said plurality of radially-oriented stator teeth, wherein said at least one moveable magnetically-permeable element is axially positionable relative to said plurality of radially-oriented stator teeth along an associated positioning axis substantially parallel to said central axis, so as to provide for linking magnetic flux between said at least one pair of adjacent stator teeth of said plurality of radially-oriented stator teeth via said at least one moveable magnetically-permeable element, and a series magnetic reluctance of said at least one pair of adjacent stator teeth in series magnetically with said at least one moveable magnetically-permeable element is responsive to an axial position of said at least one moveable magnetically-permeable element relative to said at least one pair of adjacent stator teeth;

further comprising at least one conductive coil-or-winding around and flux-linked to at least one stator tooth of said at least one pair of adjacent stator teeth, wherein said at least one moveable magnetically-permeable element provides for magnetic communication between said at least one pair of adjacent stator teeth at a radial location that is radially inboard of said at least one conductive coil-or-winding.

12. A variable-reluctance stator system for use with a radial-flux rotor of a permanent-magnet generator as recited in claim 11, wherein said at least one moveable magnetically-permeable element is located circumferentially between said at least one pair of adjacent stator teeth when fully engaged therewith.

13. A variable-reluctance stator system for use with a radial-flux rotor of a permanent-magnet generator as recited in claim 12, wherein said at least one moveable magnetically-permeable element spans across faces of said at least one pair of adjacent stator teeth when fully engaged therewith.

14. A variable-reluctance stator system for use with a radial-flux rotor of a permanent-magnet generator as recited in claim 11, wherein said at least one moveable magnetically-permeable element spans across faces of said at least one pair of adjacent stator teeth when fully engaged therewith.

15. A variable-reluctance stator system for use with a radial-flux rotor of a permanent-magnet generator as recited in claim 11, wherein for said at least one stator tooth of said at least one pair of adjacent stator teeth, said at least one conductive coil-or-winding comprises first and second associated conductive coils-or-windings or conductive coil-or-winding portions, wherein said first and second associated conductive coils-or-windings or conductive coil-or-winding portions are radially separated from one another along said at least one stator tooth, and said at least one moveable magnetically-permeable element provides for magnetic communication between said at least one pair of adjacent stator teeth at a radial location that is radially between said first and second associated conductive coils-or-windings or conductive coil-or-winding portions.

16. A variable-reluctance stator system for use with a radial-flux rotor of a permanent-magnet generator as recited in claim 15, wherein said at least one moveable magnetically-permeable element is located circumferentially between said at least one pair of adjacent stator teeth when fully engaged therewith.

17. A variable-reluctance stator system for use with a radial-flux rotor of a permanent-magnet generator as recited in claim 16, wherein said at least one moveable magnetically-permeable element spans across faces of said at least one pair of adjacent stator teeth when fully engaged therewith.

18. A variable-reluctance stator system for use with a radial-flux rotor of a permanent-magnet generator as recited in claim 15, wherein said at least one moveable magnetically-permeable element spans across faces of said at least one pair of adjacent stator teeth when fully engaged therewith.

19. A variable-reluctance stator system for use with a radial-flux rotor of a permanent-magnet generator comprising:
  a. a plurality of radially-oriented stator teeth uniformly circumferentially distributed around a central axis, wherein each radially-inboard edge of each stator tooth of said plurality of radially-oriented stator teeth is outside a cylindrical boundary centered about said central axis and configured to receive the radial-flux rotor;
  b. at least one moveable magnetically-permeable element in magnetic communication with at least one pair of adjacent stator teeth of said plurality of radially-oriented stator teeth, wherein said at least one moveable magnetically-permeable element is axially positionable relative to said plurality of radially-oriented stator teeth along an associated positioning axis substantially parallel to said central axis, so as to provide for linking magnetic flux between said at least one pair of adjacent stator teeth of said plurality of radially-oriented stator teeth via said at least one moveable magnetically-permeable element, and a series magnetic reluctance of said at least one pair of adjacent stator teeth in series magnetically with said at least one moveable magnetically-permeable element is responsive to an axial position of said at least one moveable magnetically-permeable element relative to said at least one pair of adjacent stator teeth;
  c. at least one conductive coil-or-winding around and flux-linked to at least one stator tooth of said at least one pair of adjacent stator teeth:
  d. the radial-flux rotor having an axis of rotation that is collinear with said central axis, wherein said radial-flux rotor comprises:
    i. an annular magnetically-permeable rotor yoke concentric with said axis of rotation;
    ii. an even-numbered plurality of permanent magnets operatively coupled to an outer surface of said annular magnetically-permeable rotor yoke, wherein said plurality of permanent magnets are oriented so that each North-South axis of each permanent magnet of said plurality of permanent magnets is substantially radially oriented with respect to said axis of rotation, and the North-South orientations of every pair of circumferentially-adjacent permanent magnets of said plurality of permanent magnets are opposite to one another; and
    iii. a first retaining ring encircling said plurality of permanent magnets, wherein said first retaining ring is non-magnetic, and said first retaining ring has sufficient hoop strength to retain said plurality of permanent magnets on said annular magnetically-permeable rotor yoke in reaction to centrifugal forces acting on said plurality of permanent magnets during operation of said radial-flux rotor; and
  e. at least one linear actuator operatively coupled to a corresponding said at least one moveable magnetically-permeable element that provides for positioning said corresponding said at least one moveable magnetically-permeable element along a corresponding said associated positioning axis;
  further comprising a position control system operatively coupled to said at least one linear actuator, wherein said position control system provides for controlling said at least one linear actuator responsive to at least one output voltage from said at least one conductive coil-or-winding so as to provide for regulating said at least one output voltage.

20. A variable-reluctance stator system for use with a radial-flux rotor of a permanent-magnet generator as recited in claim 19, wherein said at least one moveable magnetically-permeable element comprises a plurality of moveable magnetically-permeable elements, said at least one linear actuator comprises a plurality of linear actuators, and said position control system provides for positioning each of said plurality of moveable magnetically-permeable elements to provide for either a corresponding fully magnetically-engaged state or a corresponding fully magnetically-disengaged state, wherein in said fully magnetically-engaged state, a corresponding said at least one moveable magnetically-permeable element is positioned for a minimum reluctance condition, and in said fully magnetically-disengaged state, a corresponding said at least one moveable magnetically-permeable element is positioned for a maximum reluctance condition.

21. A method of controlling an output voltage of a radial-flux permanent magnet generator, comprising:

a. rotating a radial-flux rotor of the radial-flux permanent magnet generator about an axis of rotation, wherein said radial-flux rotor comprises:
   i. an annular magnetically-permeable rotor yoke concentric with said axis of rotation;
   ii. an even-numbered plurality of permanent magnets operatively coupled to an outer surface of said annular magnetically-permeable rotor yoke, wherein said plurality of permanent magnets are oriented so that each North-South axis of each permanent magnet of said plurality of permanent magnets is substantially radially oriented with respect to said axis of rotation, and the North-South orientations of every pair of circumferentially-adjacent permanent magnets of said plurality of permanent magnets are opposite to one another; and
   iii. a retaining ring encircling said plurality of permanent magnets, wherein said retaining ring is non-magnetic, and said retaining ring has sufficient hoop strength to retain said plurality of permanent magnets on said annular magnetically-permeable rotor yoke in reaction to centrifugal forces acting on said plurality of permanent magnets during operation of said radial-flux rotor;
b. controlling at least one axial position of at least one moveable magnetically-permeable element in relation to a magnetically-permeable stator core of a stator of said radial-flux permanent magnet generator, wherein each said at least one moveable magnetically-permeable element provides for controlling at least one of a magnitude of magnetic flux conducted within said magnetically-permeable stator core and path by which said magnetic flux is conducted within said magnetically-permeable stator core responsive to at least one axial position of said at least one moveable magnetically-permeable element relative to said magnetically-permeable stator core, wherein said magnetically-permeable stator core comprises a plurality of radially-oriented stator teeth uniformly circumferentially distributed around said axis of rotation, wherein each radially-inboard edge of each stator tooth of said plurality of radially-oriented stator teeth is outside a cylindrical boundary centered about said axis of rotation and configured to receive said radial-flux rotor; and said stator further comprises a plurality of conductive coils-or-windings, wherein each conductive coil-or-winding of said plurality of conductive coils-or-windings is located around at least one stator tooth of said plurality of radially-oriented stator teeth, and said plurality of conductive coils-or-windings are electrically connected so as to generate one or more electrical outputs from the radial-flux permanent magnet generator;
c. generating at least one output voltage from said plurality of conductive coils-or-windings; and
d. controlling said at least one axial position of a corresponding said at least one moveable magnetically-permeable element responsive to said at least one output voltage from said plurality of conductive coils-or-windings so as to provide for regulating a magnitude of said at least one output voltage.

22. A method of controlling an output voltage of a radial-flux permanent magnet generator as recited in claim 21, wherein said at least one moveable magnetically-permeable element provides for controlling a magnetic reluctance in series with at least one pair of adjacent stator teeth of said plurality of radially-oriented stator teeth at a location that is radially-outboard of a corresponding at least one of said plurality of conductive coils-or-windings that is flux-linked with said at least one pair of adjacent stator teeth.

23. A method of controlling an output voltage of a radial-flux permanent magnet generator as recited in claim 21, wherein said at least one moveable magnetically-permeable element provides for controlling a magnetic reluctance between at least one pair of adjacent stator teeth of said plurality of radially-oriented stator teeth at a location that is radially inboard of a corresponding at least one of said plurality of conductive coils-or-windings that is flux-linked with said at least one pair of adjacent stator teeth so as to reduce an amount of magnetic flux that would otherwise link with said at least one of said plurality of conductive coils-or-windings.

24. A method of controlling an output voltage of a radial-flux permanent magnet generator as recited in claim 23, wherein said stator further comprises at least one conductive coil-or-winding that is flux-linked with said at least one pair of adjacent stator teeth and that is located radially-outboard of said at least one moveable magnetically-permeable element.

25. A method of controlling an output voltage of a radial-flux permanent magnet generator as recited in claim 21, wherein said at least one moveable magnetically-permeable element comprises a plurality of moveable magnetically-permeable elements, and the operation of controlling said at least one axial position of said at least one moveable magnetically-permeable element comprises positioning each of said plurality of moveable magnetically-permeable elements to provide for either a corresponding fully magnetically-engaged state or a corresponding fully magnetically-disengaged state, wherein in said fully magnetically-engaged state, a corresponding said at least one moveable magnetically-permeable element is positioned for a minimum reluctance condition, and in said fully magnetically-disengaged state, a corresponding said at least one moveable magnetically-permeable element is positioned for a maximum reluctance condition.

\* \* \* \* \*